(12) United States Patent
Han et al.

(10) Patent No.: US 12,408,661 B2
(45) Date of Patent: Sep. 9, 2025

(54) EFFICIENT CRYOPRESERVATION DEVICE PREVENTING THE DIRECT CONTACT BETWEEN SAMPLES AND EXTRACELLULAR ICE

(71) Applicant: The Curators of the University of Missouri, Columbia, MO (US)

(72) Inventors: Xu Han, Columbia, MO (US); Peter Koulen, Leawood, KS (US); John K. Critser, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 1198 days.

(21) Appl. No.: 17/272,637

(22) PCT Filed: Aug. 30, 2019

(86) PCT No.: PCT/US2019/048986
§ 371 (c)(1),
(2) Date: Mar. 1, 2021

(87) PCT Pub. No.: WO2020/047369
PCT Pub. Date: Mar. 5, 2020

(65) Prior Publication Data
US 2021/0195890 A1    Jul. 1, 2021

Related U.S. Application Data

(60) Provisional application No. 62/724,959, filed on Aug. 30, 2018.

(51) Int. Cl.
*A01N 1/147*     (2025.01)
*A01N 1/125*     (2025.01)
*C08L 1/02*      (2006.01)

(52) U.S. Cl.
CPC ........ *A01N 1/147* (2025.01); *A01N 1/125* (2025.01); *C08L 1/02* (2013.01)

(58) Field of Classification Search
CPC ........ A01N 1/0268; A01N 1/0221; C08L 1/02
See application file for complete search history.

(56) References Cited

U.S. PATENT DOCUMENTS

| | | |
|---|---|---|
| 4,830,645 A | 5/1989 | Ghodsizadeh et al. |
| 5,816,057 A | 10/1998 | Dickey et al. |
| 2009/0148934 A1 | 6/2009 | Woods et al. |
| 2012/0128845 A1 | 5/2012 | Tosaya |
| 2018/0064100 A1 | 3/2018 | Morris et al. |

FOREIGN PATENT DOCUMENTS

| | | | |
|---|---|---|---|
| CN | 1593125 A | 3/2005 | |
| JP | 2007161723 A | 6/2007 | |
| JP | 2011528907 A | 12/2011 | |
| JP | 2018511315 A | 4/2018 | |
| WO | WO-2014138671 A2 * | 9/2014 | ............ A01N 1/021 |

OTHER PUBLICATIONS

VWR "Costar® Spin-X® Centrifuge Tube Filters, Corning" Product Catalogue: Centrifugal Filters 4 pages (accessed online Apr. 17, 2024 from << URL: US.vwr.com/store/product/4831704/null>>, archived Jun. 6, 2016), 4 pages. (Year: 2016).*
Office Action Corresponding to Chinese Patent Application No. 201980055919.1 dated Jan. 26, 2022.
Communication of European publication number Corresponding to European Patent Application No. 19854394.4 dated Jun. 9, 2021.
Extended European Search Report Corresponding to European Patent Application No. 19854394.4 dated Oct. 19, 2021.
International Search Report and the Written Opinion of the International Searching Authority corresponding to International application No. PCT/US 2019/048986 dated Feb. 19, 2020.
International Preliminary Report on Patentability Corresponding to International application No. PCT/US 2019/048986 dated Mar. 11, 2021.
Chinese Office Action for Application No. 201980055919 dated May 27, 2023.
Japanese Office Action for Application No. 2021510751 dated May 30, 2023.
Indian Office Action for Application No. 202147009907 dated Nov. 2, 2022.
Chinese Office Action for Application No. 201980055919 dated Jan. 18, 2023.

* cited by examiner

*Primary Examiner* — Aaron J Kosar
(74) *Attorney, Agent, or Firm* — KDW FIRM PLLC

(57) ABSTRACT

A cryoprotective device protects an aqueous biological material from mechanical damage due to ice formation during cryogenic freezing and/or cryostorage by preventing direct contact of the biological material with cell-damaging large ice crystals, the cryoprotective storage device having a housing with an internal cavity. The housing is configured to receive a freezable medium with the biological material within the internal cavity. The housing includes a semi-permeable membrane. The membrane is impermeable to ice crystals that are larger than an average pore size of the membrane to prevent such ice crystals from passing into the internal cavity from outside the housing, such that ice crystals formed in the medium within the housing have a smaller crystal size from ice crystals formed in the medium outside of the housing. As such, the biological material is protected from mechanical damage generated by direct contact with large ice crystals.

70 Claims, 16 Drawing Sheets

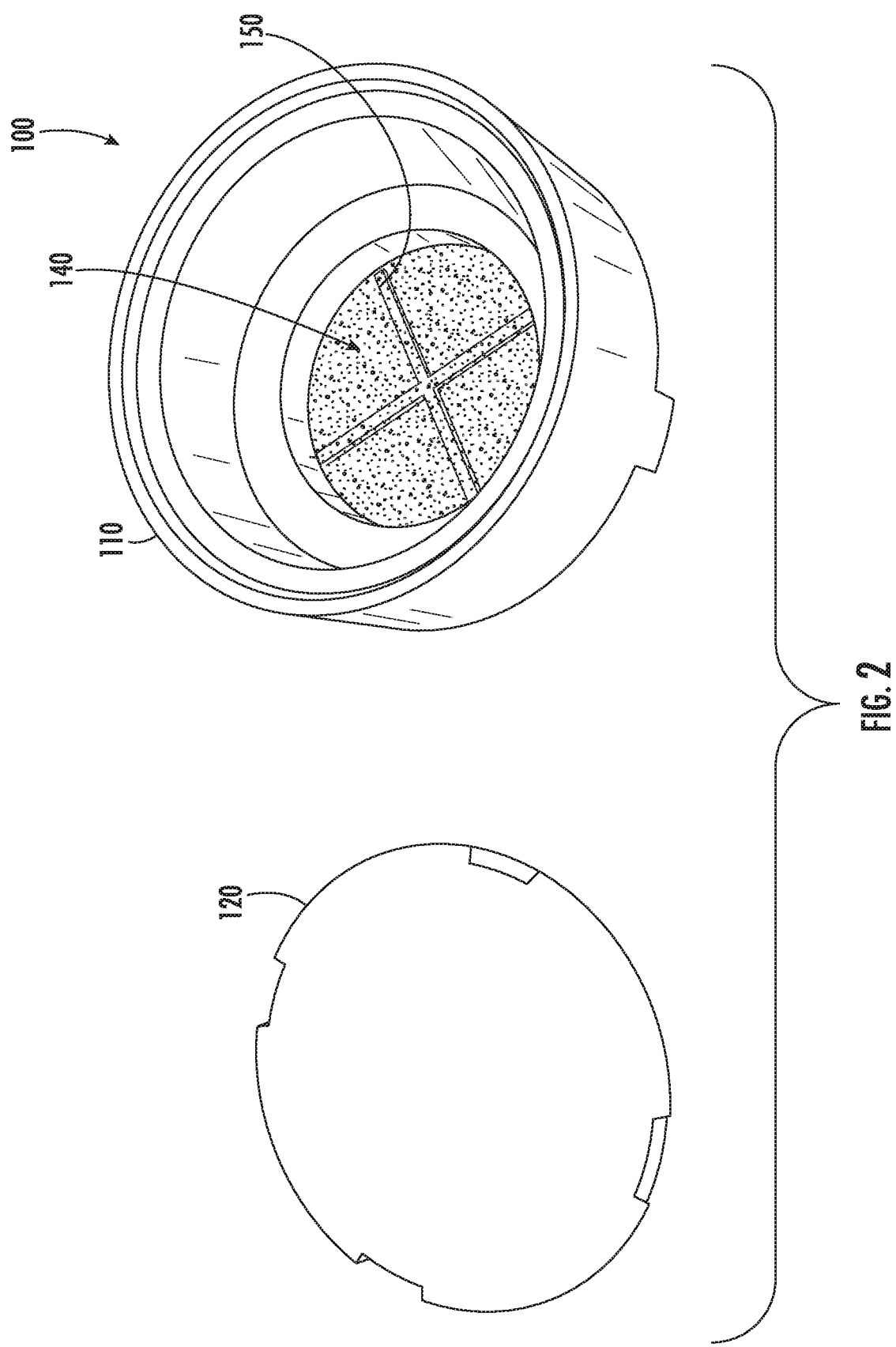

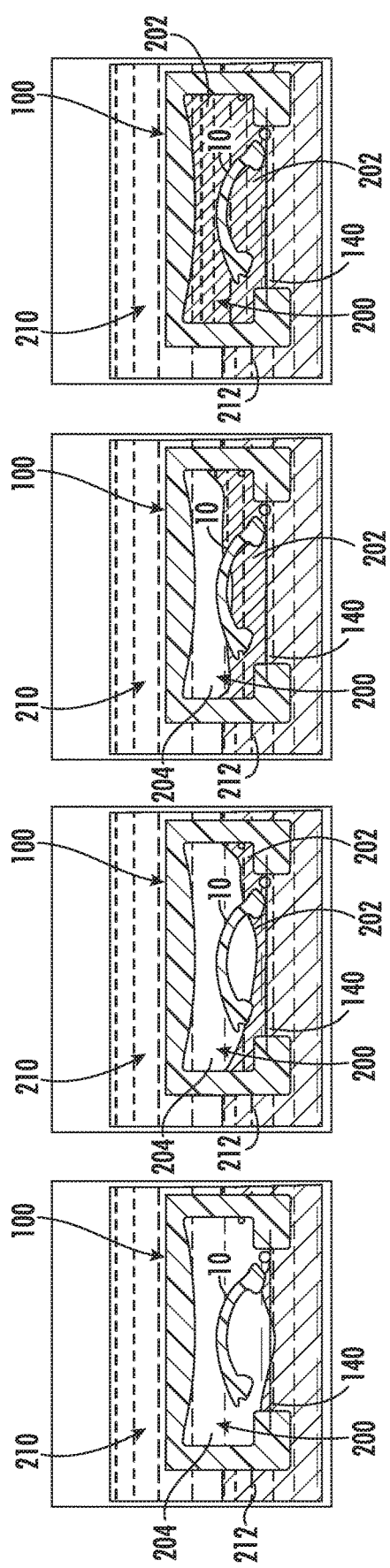
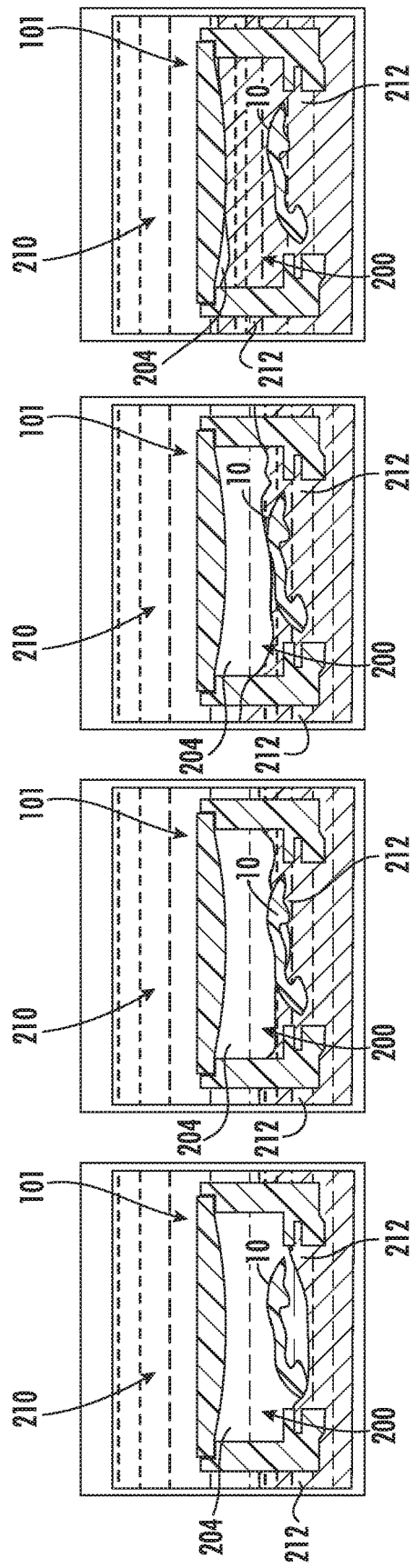

EFFICIENT CRYOPRESERVATION DEVICE PREVENTING THE DIRECT CONTACT BETWEEN SAMPLES AND EXTRACELLULAR ICE

CROSS-REFERENCE TO RELATED APPLICATION

This application claims priority to, and the benefit of, U.S. Provisional Patent Application Ser. No. 62/724,959, filed on Aug. 30, 2018, the disclosure of which is incorporated herein by reference in its entirety.

STATEMENT OF GOVERNMENT INTEREST

This invention was made with government support under grant number R41 RR025925 awarded by the National Institutes of Health. The government has certain rights in the invention.

FIELD OF THE INVENTION

The present invention is directed to the fields of cryobiology and cryopreservation and ice formation control technologies and storage of biological and clinical samples.

BACKGROUND

Cryopreservation is a technique that allows biological materials to be stored at very low temperatures, typically from about −80° C. to −196° C., e.g. in mechanical deep freezers or liquid nitrogen cryogenic freezers or tanks. Cryopreservation is known to store such biological materials for a relatively long period of time, potentially indefinitely, with no functional degradation, or substantially limited degradation, of the biological materials. Despite the critical importance for cryopreservation efficiency for advancing biomedical research and clinical applications, traditional cryogenic storage and cryopreservation procedures result in poor survivability for numerous cell and tissue types that are highly valuable for transplantations, regenerative medicine, and personalized medicine.

Corneas are typical examples, among many other cell and tissue types, that suffer from low viability and impaired function after traditional cryogenic storage. Worldwide, approximately 100,000 corneal transplantation medical procedures are being performed each year, but there are potentially 10 million patients. Hypothermia, in which the corneal tissue is stored from about 2-8° C., is the commonly applied storage method for corneal tissue, but such a preservation method only allows for effective storage of less than two weeks before the corneal tissue becomes damaged and unsuitable for transplantation. As a result, currently, for many developing countries, due to either cultural or policy restrictions and technical limitations, domestic corneal donation or collection is minimal, and it is also highly challenging for patients in these countries to obtain qualified corneas from developed countries. Transplantation of biosynthetic corneas is a highly promising solution and will soon require efficient long-term tissue storage, which is currently unavailable for international distribution. Corneal tissue is also of significant importance for medical or fundamental research applications. Approximately 30,000 donor corneas are used annually for such medical and/or research purposes. Quality-controlled corneal tissue is either not available or, in many cases, is not affordable.

The efficacy associated with medical transplantation of human corneas that have been cryopreserved in liquid nitrogen has made only modest progress in recent years, and suffers from endothelial cell loss of approximately 30% or more. As a result, even after decades of efforts, cryopreservation of corneas has failed to gain wide acceptance, owing to its facility and labor demanding nature, its cost inefficiency, and the highly variable clinical and experimental results achieved. Similarly, for other relatively complicated tissue types, such as, for example, vascular and ovarian tissues, no practical cryopreservation method is available, even though such tissue types are highly important for critical disease treatment or related biomedical technology development.

Two general cooling methods are widely adopted in traditional cryopreservation technologies to reach storage temperatures; namely, non-equilibrium (vitrification), and equilibrium (slow freezing).

For the non-equilibrium cooling method, the biological material, which can be, for example, cells and/or tissue samples, are typically loaded with remarkably high concentrations (e.g., typically 40-60% in volume) of cell membrane permeating cryoprotectants (generally small organic molecules, e.g. dimethyl sulfoxide (DMSO), ethylene glycol, glycerol, and propanediol) and then cooled at high cooling rates (e.g., $10^2$ to $10^4$ K/min) by directly plunging the biological material into liquid nitrogen or other cryogenic liquids or mixtures, to achieve an amorphous solid state in the biological material without the formation of ice crystals, i.e., by vitrification. The non-equilibrium cooling method not only introduces severe cell osmotic damage and toxicity due to the high cryoprotectant concentration, but it is also a complicated and time-consuming procedure for loading and removal of cryoprotectants into/out of cells and tissues. Another critical technical issue is generated by the devitrification of the biological material. For example, if a vitrified sample is transferred to an environment not having cryogenic temperatures (e.g., above −80° C.) for storage, the ice crystallization inside a vitrified sample that occurs when the temperature in the sample becomes higher than the devitrification temperature will cause severe mechanical damage to the sample.

For the traditional equilibrium, or slow-freezing, method, the procedures involved generally include adding relatively low concentrations (e.g., typically 10% or less) of cryoprotective agents to the biological material (e.g., cells) before cooling; seeding one or more samples of the biological material at or a few degrees below the freezing point of the cell suspension and cooling the cells toward a storage temperature at which the cells are stored; warming the cells; and removing the cryoprotectant agents from the cells. Diminishing cell damage caused by freezing processes is of critical importance to improving cell survival after cryopreservation. During freezing, ice forms in the external (e.g., outside of tissues or cells) cryopreservation medium and the mechanical stress associated with extracellular ice crystals has been demonstrated to induce cellular damage and lethal tissue mechanical damage. During slow freezing, damage to isolated cells is attributed to ice shearing forces or a compression force on a cellular scale, that is to some extent tolerable for many cell types. However, for tissues, the direct contact with tissues and the growing ice front causes macroscale damage with both shear and compression forces, and introduces relatively large ice crystals in the tissue interstitial space, especially miniature structures of tissues, causing not only cell loss but also loss of tissue functionalities due to structural deformation.

Prior to the device of the present invention, there has been no device or efficient physical approach available to prevent tissue mechanical damage caused by slow freezing procedures, and vitrification is the general method utilized for tissue cryopreservation.

In numerous practical applications in short-term storage (typically less than one week) of biological cells and tissues, specimens are treated with hypothermia media without any cryoprotectant and refrigerated at a temperature, e.g. 2-8° C., which is below room temperature, but above the freezing point of the hypothermia media (approximately 0° C.). Further lowering the storage temperature to a value lower than 0° C. could extend the storage duration, but the inevitable ice formation below the freezing point of the hypothermia media without cryoprotectant causes lethal damage to the cells and tissues. At present, there is no known device or efficient approach to attenuate cellular damage generated by ice formation without using cryoprotectants. This limitation restricts the efficiency of hypothermia approaches to a short period of time. Furthermore, the hypothermia temperature at which such specimens are stored is close to the freezing point and, in normal storage conditions, the temperature fluctuation caused by the normal operation of mechanical refrigerators can result in the accidental destruction of specimens by unexpected ice formation. As such, there is no known device or efficient approach available to minimize the damages generated by such accidental ice formation during hypothermia storage of specimens.

BRIEF SUMMARY OF THE INVENTION

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

According to a first aspect, a cryoprotective device for protecting a specimen from mechanical damage during cryopreservation is provided, the device comprising: a housing forming an internal cavity, wherein the housing is configured to receive a freezable medium within the internal cavity; wherein the housing comprises a semi-permeable membrane, the membrane being impermeable to ice crystals that are significantly larger than an average pore size of the membrane to prevent any such ice crystals from passing into the internal cavity from a region outside of the housing, such that ice crystals formed in the medium within the housing have a smaller crystal size from ice crystals formed in a freezable medium outside of the housing.

In some embodiments of the device, a first opening is formed at a first longitudinal end of the housing and the membrane is arranged over a second opening formed in the housing.

In some embodiments of the device, the housing is configured to receive the specimen within the internal cavity through the first opening.

In some embodiments of the device, the housing is a buoyant support to which the membrane is attached to define the internal cavity, such that the membrane is submersible within the freezable medium outside of the housing, with at least a portion of the buoyant support not being submerged in the freezable medium outside of the housing.

In some embodiments, the specimen comprises a cell suspension or biological tissue in its natural or conventional media and/or solution, as the case may be, which can itself be devoid of any cryoprotectant. It has been found that short-term storage at cryogenic temperatures can be effective without such cryoprotectants with minimal or acceptable cell and/or tissue loss.

In some embodiments of the device, the membrane is a porous solid layer.

In some embodiments of the device, the porous solid layer allows water and liquid state material to permeate therethrough, but prevents the passage of ice crystals larger than a pore size of the membrane from passing through the membrane, the ice crystals being formed by solidification of the cryopreservation outside of the housing when the device is exposed to cryogenic temperatures.

In some embodiments of the device, the porous solid layer comprises pores having pore diameters in a range from about 0.1 nanometer (nm) to about 1 millimeter (mm). from about 0.5 nm to about 0.1 mm, from about 1 nm to about 100 nm, or from about 2 nm to about 10 nm.

In some embodiments of the device, the membrane comprises a natural or synthetic polymer.

In some embodiments of the device, the membrane comprises a synthetic polymer comprising polyacrylonitrile, polymethylmethacrylate, polysulfone, ethylenevinyl alcohol co-polymer, or any combination or chemical derivative thereof.

In some embodiments of the device, the membrane comprises a cellulose material.

In some embodiments of the device, the cellulose material comprises regenerated cellulose, degenerated cellulose, cellulose diacetate, cellulose triacetate, or any combination or chemical derivative thereof.

In some embodiments of the device, the membrane is a dialysis membrane made of degenerated cellulose.

In some embodiments of the device, the membrane is permeable to water, organic and/or inorganic liquid solvents, or any combination thereof.

In some embodiments of the device, the membrane is a separable membrane that is configured to be selectively mounted to cover the second opening.

In some embodiments of the device, the medium comprises a cryoprotective medium having cryoprotective materials suspended therein as additives.

In some embodiments of the device, the housing comprises a recess in which the membrane is mounted to the housing to cover the second opening, the device comprising a support ring configured to be selectively attached to the housing to secure the membrane over the second opening when the support ring is attached to the housing.

In some embodiments of the device, the support ring comprises an outer support member having a hole formed therethrough, such that the membrane is exposed to the medium external from the housing through the hole formed in the support ring when the support ring is mounted to the housing.

In some embodiments of the device, the housing comprises at least one locking tab that lockingly engages against the support ring to fasten the support ring to the housing.

In some embodiments of the device, the first opening is configured such that the sample is passable into the internal cavity.

In some embodiments, the device comprises a cover that is configured to be secured to the housing to close the first opening.

In some embodiments of the device, the cover comprises at least one vent formed in a perimeter of the cover to allow the medium in the internal cavity to flow through the at least one vent as the cover is secured to the housing.

In some embodiments of the device, the cover comprises an interior surface that has a convex shape, such that the cover protrudes farther into the internal cavity at a center of the cover than at a perimeter of the cover.

In some embodiments of the device, the housing has a generally cylindrical shape with a circular cross-section.

In some embodiments of the device, the freezable medium is a liquid at 25° C. and a solid below 0° C.

In another aspect, a system for storing a specimen at a cryogenic temperature is provided, the system comprising: at least one cryoprotective storage device as described in any of the embodiments disclosed herein; an external container configured to receive one or more of the cryoprotective storage devices; and a freezable medium for use in the internal cavity of the housing and within the external container, external to the housing.

In some embodiments of the system, the freezable medium comprises a hydrophilic and non-toxic macromolecule and an aqueous liquid. In some such embodiments of the system, the freezable medium comprises a cryoprotectant.

In some embodiments of the system, the cryoprotectant comprises dimethyl sulphoxide (DMSO), glycerol, ethylene glycol, propanediol, sucrose, glucose, Dextran and other polysaccharides, polyvinylpyrrolidone and polyethylene glycol and other polymers, other non-permeating cryoprotectants including, but not limited to, chondroitin sulfate and lactobionates, or any combination thereof.

In some embodiments of the system, the hydrophilic and non-toxic macromolecule is a polymer.

In some embodiments of the system, the polymer forms a three-dimensional structure that is substantially spherical in shape when dissolved in an aqueous liquid.

In some embodiments of the system, the aqueous liquid comprises a cell culture medium, a nutritious medium, a saline, or any combination thereof.

In some embodiments of the system, the aqueous liquid comprises a serum, fetal bovine serum (FBS), Dulbecco's Modified Eagle Medium (DMEM), 4-(2-hyroxyethyl)-1-pierazineethanesulfonic acid (HEPES), flushing-holding medium (FHM), phosphate buffered serum (PBS), Dulbecco's phosphate buffered saline (DPBS), Roswell Park Memorial Institute medium (RPMI), BF5 medium, EX-CELL medium, Lysogeny broth (LB) medium, $CaCl_2$) aqueous solution, NaCl aqueous solution, KCl aqueous solution, or any combination thereof.

In some embodiments of the system, a concentration of the polymer in the medium is greater than about 5% (w/v), greater than about 10% (w/v), greater than about 20% (w/v), or greater than about 50% (w/v).

In some embodiments of the system, a concentration of the cryoprotectant within the medium is equal to or greater than about 20%, equal to or greater than about 50%, equal to or greater than about 75%, or equal to or greater than about 100% of the concentration of the polymer in the medium.

In some embodiments of the system, the medium contains about 10% (w/v) Ficoll, about 5% (w/v) DMSO, about 2% (w/v) chondroitin sulfate, and about 1% (w/v) Dextran 40.

In some embodiments of the system, Ficoll is a polysaccharide formed by copolymerization of sucrose and epichlorohydrin.

In some embodiments of the system, the polymer is selected from the group consisting of hydrophilic polysaccharides, polymerized cyclodextrin or saccharides, globular proteins or spheroproteins, spherical glycoproteins formed by attaching oligosaccharide chains of globular proteins, other derivatives of globular proteins, and combinations thereof.

In some embodiments of the system, the polymer is a hydrophilic polysaccharide.

In some embodiments of the system, the polysaccharide is formed by the copolymerization of sucrose and epichlorohydrin.

In some embodiments of the system, the medium fills part or all of a space between the external container and the at least one cryoprotective storage device, the medium being provided in a quantity sufficient to at least cover a surface of the membrane oriented away from the internal cavity.

In some embodiments of the system, a composition of the medium outside of the cryoprotective storage device is different from, or the same as, a composition of the medium in the internal cavity of the cryoprotective storage device.

In still another aspect, a method of protecting a specimen from damage during cryogenic freezing is provided, the method comprising: providing a housing having an internal cavity, wherein the housing comprises a semi-permeable membrane; providing the specimen and a first freezable medium in the internal cavity of the housing; placing the housing within a second freezable medium external from the housing, such that the housing is partially or entirely submerged in the second freezable medium, wherein the second freezable medium is the same as, or different from, the first freezable medium; exposing the second freezable medium to a cryogenic temperature, such that ice crystals having a first size form external to the housing in the second freezable medium; wherein growth of the ice crystals of the first size in the second freezable medium is stopped by the membrane, such that only ice crystals of a second size, which is smaller than a pore size of the membrane, can pass through the membrane and introduce ice formation in the first freezable medium within the internal cavity of the housing, thereby generating ice crystals within the housing that have a smaller size than ice crystals formed in the second freezable medium outside of the housing.

In some embodiments of the method, a first opening is formed at a first longitudinal end of the housing and the membrane is arranged over a second opening formed in the housing.

In some embodiments of the method, the housing is configured to receive the specimen within the internal cavity through the first opening.

In some embodiments of the method, the housing is a buoyant support to which the membrane is attached to define the internal cavity, such that the membrane is submersible within the freezable medium outside of the housing, with at least a portion of the buoyant support not being submerged in the freezable medium outside of the housing.

In some embodiments of the method, the first and/or second freezable mediums comprise a hydrophilic and non-toxic macromolecule and an aqueous liquid.

In some embodiments of the method, the first and/or second freezable mediums also comprise a cryoprotectant; and, as a temperature of the first freezable medium decreases, water in the first freezable medium inside the chamber permeates through the membrane, to increase a concentration of the cryoprotectant within the first freezable medium during the cryogenic freezing.

In some embodiments of the method, permeating the water from the first freezable medium to the second freezable medium through the membrane increases a concentration of a solute in the first freezable medium and/or a decrease in a freezing temperature of the first freezable medium to prevent supercooling of the first freezable medium.

In some embodiments of the method, the ice crystals formed in the second freezable medium are larger and are formed at a higher temperature than ice crystals formed in the first freezable medium; the membrane comprises a porous material having a pore diameter smaller than a diameter of the ice crystals formed in the second freezable medium; and/or damage to the specimen is reduced, relative to storing the specimen in a housing without a membrane that allows water to permeate therethrough.

In some embodiments of the method, the membrane is positioned over the second opening to allow fluid communication therethrough.

In some embodiments, the method comprises attaching a support ring to the housing so that the membrane is secured to the housing over the second opening, the support ring having one or more opening formed therein to allow fluid communication through the membrane between the first and second freezable mediums.

In some embodiments of the method, the housing is a part of a cryoprotective storage device.

In some embodiments, the method comprises providing an external container containing the second freezable medium before exposing the temperature of the second freezable medium to the cryogenic temperature, wherein exposing the temperature of the second freezable medium to the cryogenic temperature comprises placing the external container in an ambient environment having a cryogenic temperature, and wherein the housing is placed within the external container, such that the housing is partially or entirely submerged in the second freezable medium.

In some embodiments of the method, the external container comprises a cryovial.

In some embodiments of the method, the sample and the first freezable medium are provided in the internal chamber through the first opening.

In some embodiments, the method comprises securing a cover over the first opening.

In some embodiments of the method, when the cover is secured over the first opening, any excess first freezable fluid in the internal cavity is displaced from the internal cavity, such that the internal cavity is substantially free of air when the cover is secured over the first opening.

In some embodiments of the method, the specimen comprises cells or at least one tissue sample suspended in the first freezable medium.

In some embodiments of the method, the tissue sample comprises natural biological tissues, artificial tissues, or combinations thereof.

In some embodiments of the method, the natural biological tissues comprise human, animal, plant, or microbial multiple cell tissues, or combinations thereof.

In some embodiments of the method, the artificial tissues comprise artificial human, animal, plant, or microbial multiple cell tissues, or combinations thereof.

In some embodiments of the method, the tissue sample comprises corneal tissue or retinal tissue.

In some embodiments of the method, the cells comprise one or more eukaryotic cells, one or more prokaryotic cells, or combinations thereof.

In some embodiments of the method, the one or more eukaryotic cells comprise at least one mammalian cell.

In some embodiments of the method, the at least one mammalian cell comprises one or more murine cell, one or more porcine cell, one or more human cell, or combinations thereof.

In some embodiments of the method, the at least one mammalian cell comprises one or more stem cell, one or more somatic cell, one or more reproduction cell, or combinations thereof.

In some embodiments of the method, the one or more prokaryotic cells comprise at least one bacteria cell, at least one archeal cell, or combinations thereof.

In some embodiments of the method, the cryogenic temperature is from about −273° C. to about 0° C., inclusive.

In some embodiments of the method, the cryogenic temperature is from about −196° C. to about −20° C., inclusive.

In some embodiments of the method, the cryogenic temperature is from about −100° C. to about −40° C., inclusive.

In some embodiments of the method, the cryogenic temperature is from about −85° C. to about −65° C., inclusive.

The present disclosure is directed towards devices, systems, and methods that improve cell or tissue cryopreservation efficiency by protecting specimens from direct contact with extracellular ice using a semi-permeable membrane. The device also has special features that facilitate its clinical applications for tissue cryopreservation, including an optional structural design to gain a disposable and good-for-one-use fashion design, and a mechanical design to improve tissue loading and device airtight sealing.

Freezing temperatures are defined herein as temperatures in the range −273° C. to 0° C.

In some aspects, a sealed housing contains cell or tissue suspension in a freezable medium, which can be a cryopreservation medium. The size of the housing is selected to fit the volume of the freezable medium, wherein one or more walls or side or cover of the housing is made of, or is otherwise configured to have secured thereto, such a membrane which is semipermeable at freezing temperatures.

In some aspects, an external container is provided to hold one or more such housings, wherein such housings are submerged in a further freezable medium (which can also be a cryoprotective medium, either the same as, or different from, the freezable medium in the housing) in the external container.

In some aspects, the membrane separates the freezable medium inside the housing from the freezable medium outside of the housing (e.g., in the external container).

In some aspects, during a cryogenic freezing of a specimen, ice formation inside the freezable medium outside of the housing (e.g., within the container) gradually increases concentrations of solutes located outside of said chamber.

In some aspects, during a cryogenic freezing of a specimen, the freezable medium inside the housing loses water through the semi-permeable membrane to the freezable medium external to the housing as the freezable medium external to the housing freezes, thereby maintaining balance between chemical potentials across the membrane.

In some aspects, during a cryogenic freezing of a specimen, the freezable medium inside the housing remains free of ice crystals until the temperature of the freezable medium inside the housing is sufficiently low to allow ice crystals located outside of the housing (e.g., on a surface of the membrane external to the housing) to penetrate through the membrane and to generate ice nuclei inside the housing and to form ice crystals inside the housing, the ice crystals formed within the housing having a size that is much smaller than that of those located outside of the chamber, thereby minimizing mechanical damage to the specimen (e.g., cells or tissues) inside the housing due to the formation of ice crystals during the cryogenic freezing process.

In some aspects, the temperature that allows the ice crystals located external to the housing to pass through the membrane is lower than the freezing points of the freezable medium, but higher than the cryogenic storage temperature (e.g., the ambient temperature to which the freezable medium is exposed during the cryogenic freezing process).

In some aspects, the cover and/or one of the walls of the housing is separated from the housing before assembly to allow the specimen(s) to be loaded into the housing. In some such aspects, the cover and/or one of the walls of the housing has a convex surface to reject or push aside excess freezable medium within the housing during the loading of the specimen(s) or during system assembly. In some such aspects, the cover and/or one of the walls of the housing has venting channels provided and/or formed therein to release the excess freezable medium to prevent pressure building in the housing that could damage the membrane and cause the housing to leak. In some such aspects, the vents are in the form of venting channels, which are covered by the walls of the housing after assembly to ensure airtight sealing of the housing and prevent air bubble formation.

In some aspects, beneath the membrane of the housing, a cross-shaped support ring is attached. In some such aspects, the support ring can be disassembled from the housing easily with minimal mechanical force. In some such aspects, the support ring provides a good-for-one-use fashion by requiring the end-users to remove the support ring to remove the membrane for retrieval of the specimen(s) from within the housing after undergoing a thawing process. In some such aspects, the housing cannot be opened after its assembly with one or more of the cover, the membrane, and the support ring without damaging the housing in a manner that would result in the housing being incapable of being sealed.

In some other aspects, the devices and/or systems disclosed herein, or one or more portions thereof, are reusable.

BRIEF DESCRIPTION OF THE DRAWINGS

FIG. 2 is an isometric view of a device for cryogenic freezing and storage of a specimen, for example, a biological sample.

FIGS. 6A-6D show cross-sectional views of a device of FIG. 2, which has a specimen placed therein, showing the progression of ice crystal formation at several stages during the cryogenic freezing process.

FIGS. 6E-6H show cross-sectional views of a device of FIG. 2, which has a specimen placed therein but with the membrane being omitted, showing the progression of ice crystal formation at several stages during the cryogenic freezing process.

DETAILED DESCRIPTION

Figure 1:
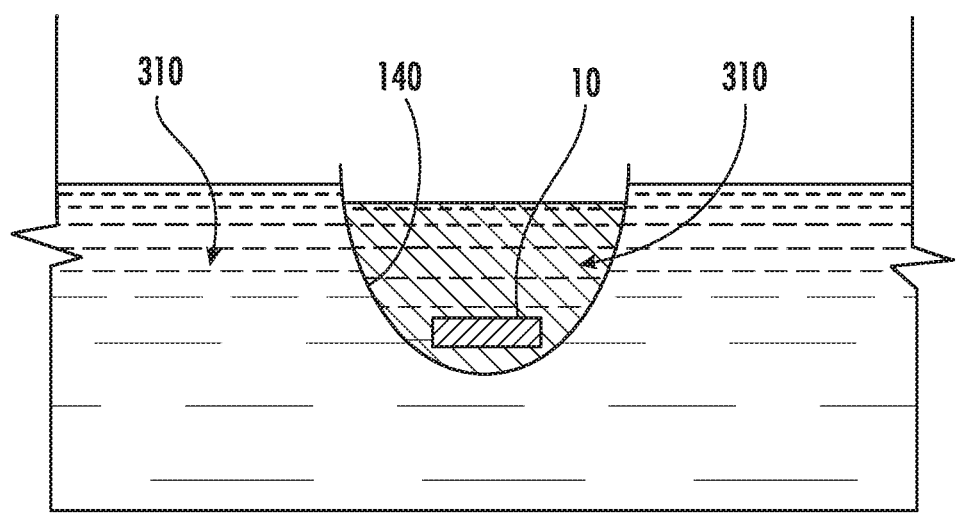
FIG. 1 is a cross-sectional view of an example embodiment for a device for cryogenic freezing and storage of a specimen, for example, a biological sample.

The presently disclosed subject matter now will be described more fully hereinafter, in which some, but not all embodiments of the presently disclosed subject matter are described. Indeed, the disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the present disclosure and the claims.

All publications, patent applications, patents and other references cited herein are incorporated by reference in their entireties for the teachings relevant to the sentence and/or paragraph in which the reference is presented.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "substantially," when referring to a value, an activity, or to an amount of a composition, mass, weight, temperature, time, volume, concentration, percentage, etc., is meant to encompass variations of in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed apparatuses and devices. For example, a media or environment is "substantially hypoxic" when it is at least 60%, or at least 75%, or at least 80%, or at least 85%, or at least 90%, or at least 95%, and, in certain cases, at least 99%.

The term "basal medium", as used herein, refers to a minimum essential type of medium, such as Dulbecco's Modified Eagle's Medium, Ham's F12, Eagle's Medium, RPMI, ARB, etc., to which other ingredients can be added. The term does not exclude media which have been prepared or are intended for specific uses, but which upon modification can be used for other cell types, etc.

A "compound," as used herein, refers to any type of substance or agent that is commonly considered a drug, therapeutic, pharmaceutical, small molecule, or a candidate for use as the same, as well as combinations and mixtures of the above.

The use of the word "detect" and its grammatical variants is meant to refer to measurement of the species without quantification, whereas use of the word "determine" or "measure" with their grammatical variants are meant to refer to measurement of the species with quantification. The terms "detect" and "identify" are used interchangeably herein.

The term "ingredient" refers to any compound, whether of chemical or biological origin, that can be used in cell culture media to maintain or promote the proliferation, survival, or differentiation of cells. The terms "component," "nutrient", "supplement", and ingredient" can be used interchangeably and are all meant to refer to such compounds. Typical non-limiting ingredients that are used in cell culture media include amino acids, salts, metals, sugars, lipids, nucleic acids, hormones, vitamins, fatty acids, proteins and the like. Other ingredients that promote or maintain cultivation of cells ex vivo can be selected by those of skill in the art, in accordance with the particular need.

The term "inhibit," as used herein, refers to the ability of a compound, agent, or method to reduce or impede a described function, level, activity, rate, etc., based on the context in which the term "inhibit" is used. Preferably, inhibition is by at least 10%, more preferably by at least 25%, even more preferably by at least 50%, and most preferably, the function is inhibited by at least 75%. The term "inhibit" is used interchangeably with "reduce" and "block."

The term "material", as used herein, refers to synthetic and natural materials such as matrix components. The term "materials and compounds" as used herein, refers to, inter alia, materials, compounds, cells, peptides, nucleic acids, drugs, matrix components, and imaging agents.

The term "modulate", as used herein, refers to changing the level of an activity, function, or process. The term "modulate" encompasses both inhibiting and stimulating an activity, function, or process. The term "modulate" is used interchangeably with the term "regulate" herein.

The term "prevent," as used herein, means to stop something from happening, or taking advance measures against something possible or probable from happening. For example, in the context of the presently disclosed subject matter, "prevention" generally refers to action taken to decrease the chance of ice formation and/or tissue/cell damage during cryopreservation.

The term "regulate" refers to either stimulating or inhibiting a function or activity of interest.

A "sample," as used herein, refers to a biological sample from a subject, including, but not limited to, normal tissue samples, diseased tissue samples, biopsies, blood, saliva, feces, semen, tears, and urine. A sample can also be any other source of material obtained from a subject which contains cells, tissues, or fluid of interest.

The term "stimulate" as used herein, means to induce or increase an activity or function level such that it is higher relative to a control value. The stimulation can be via direct or indirect mechanisms. In one aspect, the activity or function is stimulated by at least 10% compared to a control value, more preferably by at least 25%, and even more preferably by at least 50%. The term "stimulator" as used herein, refers to any composition, compound or agent, the application of which results in the stimulation of a process or function of interest, including, but not limited to, wound healing, angiogenesis, bone healing, osteoblast production and function, and osteoclast production, differentiation, and activity.

"Tissue" means (1) a group of similar cells united to perform a specific function; (2) a part of an organism consisting of an aggregate of cells having a similar structure and function; and/or (3) a grouping of cells that are similarly characterized by their structure and function, such as muscle or nerve tissue.

As noted elsewhere herein, during cryopreservation, the sharp ice dendrites on the growing ice front mechanically damage cells on the tissue surface when the outer surface of the tissue sample is contacted by the ice as the ice front grows to envelope the tissue. As a result, tissues with a functional cell layer on their surface (e.g., corneas with the endothelium cell layer) are vulnerable to this type of mechanical damage. It is therefore advantageous to provide, according to the subject matter disclosed herein, a semipermeable membrane within such cryopreservation devices and/or systems to "filter" the large ice dendrites and only allow ice crystals having a small, or fine, crystalline structure (e.g., without the formation of large ice dendrites known from the prior art cryopreservation devices, systems, and methods) to grow through the membrane. By the inclusion of such a semi-permeable membrane, the mechanical damage generated by direct contact between outer cell layers of the tissue samples with sharp ice dendrites present on the ice front, as is known from the prior art, can be prevented.

According to the subject matter disclosed herein, semipermeable membranes (e.g., cell plasma membranes) can be used as ice growth barriers during cryopreservation freezing processes. For example, the pore size of channels on a cell membrane can be on the order of $10^{-10}$ m, pores of such sizes only allowing ice crystals to grow through them with about −20° C. super-cooling. Due to this super-cooling of the intracellular solution (e.g., the cryopreservation medium), the solute concentration of the intracellular solution is kept lower than that of the extracellular solution, so that the difference between the chemical potential of the intracellular and extracellular water drives the intracellular water to permeate through the membrane and mix into the extracellular solution. This process increases the intracellular solute concentration and further lowers the freezing point of the intracellular solution and, more importantly, prevents a direct contact between intracellular organelles and extracellular ice. As a result, when a proper cooling rate is chosen, the intracellular solution is kept free of ice and is vitrified, or forms extremely small ice crystals (e.g., having crystal sizes between 1-100 nanometers (nm)) upon completion of the cryopreservation freezing process. The use of such cellular membranes for tissue cryopreservation minimizes mechanical damage of the biological material undergoing cryopreservation by minimizing direct contact between large ice crystals and the biological material. For isolated cells, another layer of such membranes in addition to the cell membrane will further protect cellular miniature structures on cell surfaces or bodies, especially for sperm tails and neuron dendrites.

Figure 3A:
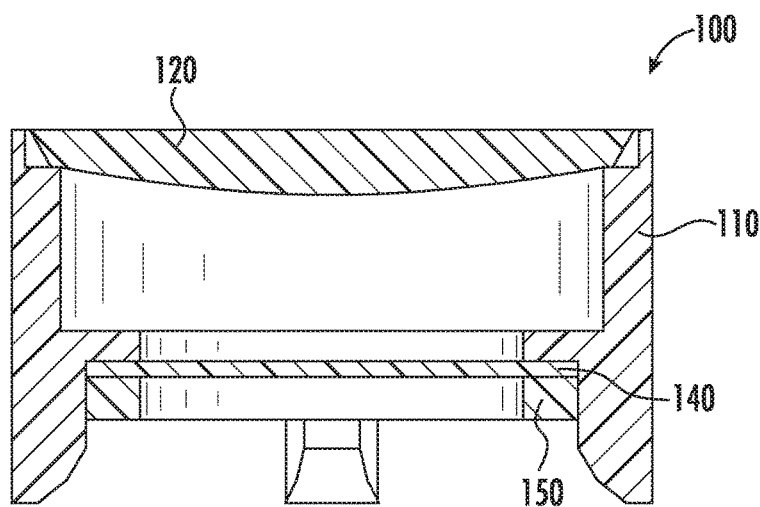
FIG. 3A is a cross-sectional view of the device shown in FIG. 2.
Figure 3B:
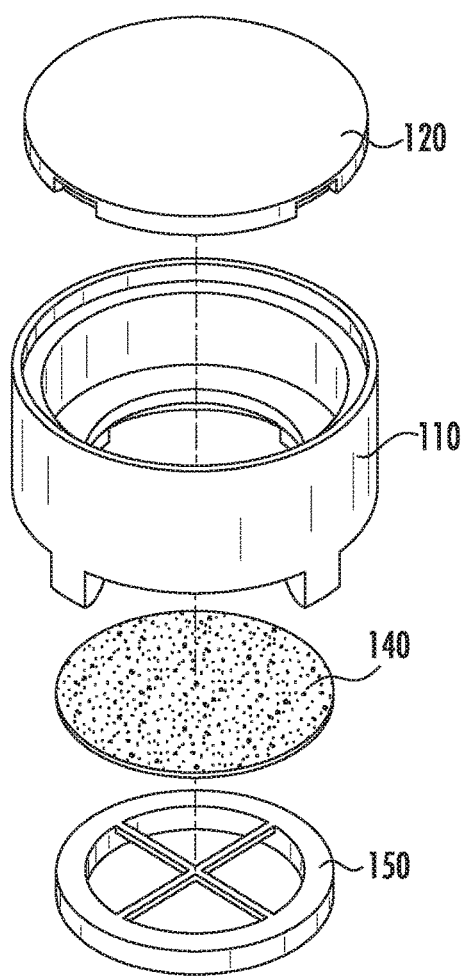
FIG. 3B is an exploded view of the device shown in FIG. 2.

As such, the presently disclosed subject matter is directed to a device that separates specimens comprising biological materials (e.g. tissues or cells in their cryopreservation medium) from ice formation during slow freezing procedures to minimize cryo-injuring effects from the formation of large ice crystals. An example embodiment of such a device, generally designated 100, is shown in FIGS. 2-3B. The device uses a semi-permeating membrane 140 to prevent direct contact between specimens and a growing ice front and to impede the growth of relatively large ice crystals that would otherwise grow through the area occupied by the membrane 140 until the temperature is sufficiently low. During the cryogenic freezing process, ice formation occurs primarily outside of the housing 110 of the device 100. The formation of the ice crystals increases the solute concentrations in the cryogenic medium external to the housing 110 of the device 100. The imbalance between the chemical potential across the membrane 140 (e.g., between the cryogenic mediums inside and outside of the housing 100) then causes the water inside the housing 110 to permeate across and/or through the membrane 140 to the exterior of the housing 110. This permeation of water across the membrane 140 also prevents supercooling of the outer compartment in which the devices are contained (see, e.g., FIGS. 9, 10, 12, and 13) containing the specimens, and without such prevention, the supercooling process may result in instant large ice crystal formation directly surrounding or inside the samples. The permeation of water across the membrane 140 also prevents formation of sharp ice crystals (e.g., dendrites) directly contacting and damaging functional cells on the outer surfaces of such specimens of biological material (e.g. corneal endothelium on the corneal surface).

As described in more detail in the various examples presented elsewhere herein, the device 100 efficiently prevents the growth of large ice crystals through the membrane 140 during the cryogenic freezing process, thereby effectively separating the specimen within the device 100 from the growing ice front formed during conventional cryogenic freezing processes. The device 100, by reducing the formation of large ice crystals growing through the membrane 140 in the region of the specimen, significantly improves tissue cryopreservation efficiency. In certain embodiments, the membrane 140 is a soft semi-permeable membrane. In some embodiments, the membrane 140 has a surface area that is substantially the same size as, or greater than, the surface area of the specimen being cryogenically processed. In some embodiments, the surface area of the membrane 140 is substantially the same size as, or greater than, the surface area of the portion of the specimen that is to be protected, for example, the valuable area of the tissue, which can be, for example, a cornea. The term "semi-permeable" means that the membrane 140 is permeable to water but impermeable to salts, ions, any large organic molecules, etc. The membrane may, in some embodiments, be either permeable or impermeable to small organic molecules (e.g., dimethyl sulfoxide, or DMSO, and ethylene glycol). In some embodiments, the membrane 140 comprises a synthetic polymer comprising polyacrylonitrile, polymethylmethacrylate, polysulfone, ethylenevinyl alcohol co-polymer, or any combination or chemical derivative thereof. In some embodiments, the membrane 140 is a cellulose material, which can comprise regenerated cellulose, degenerated cellulose, cellulose diacetate, cellulose triacetate, or any combination or chemical derivative thereof. In some embodiments, the device 100 significantly improves the cryopreservation efficiency for specimens, including, for example, corneal tissue.

According to one embodiment shown in FIG. 1, the device comprises a semi-permeable membrane 140 as described elsewhere herein, which acts as an ice barrier between fluid 310 located within the membrane 140 and outside of the membrane 140. The specimen 10 is placed within the chamber formed by the membrane 140, which is then submerged, at least partially, within a bath of a freezable medium (e.g., a fluid which freezes at cryogenic or non-cryogenic freezing temperatures). The freezable medium is frozen and only sufficiently small ice crystals (e.g., having a size, or diameter, that is the same size or smaller than that of the pores of the membrane 140) may pass through the membrane 140 to freeze about the surface of the specimen, resulting in the specimen only being exposed to ice crystals having a substantially similar (e.g., within 25%, within 10%, within 5%, within 1%) size as the size, or diameter, of the pores of the membrane 140. It may be advantageous to attach the membrane 140 to a support member, e.g., a buoyant annular member, such that the membrane 140 can be in the form shown. The support member can take any shape, including extending in three-dimensions, to achieve any desired shape of the membrane 140 during freezing and/or cryopreservation. In some embodiments, the membrane 140 has a substantially flat bottom section. In some embodiments membrane 140 forms a bag or flexible container for holding a specimen 10 during freezing or cryopreservation.

The device 100 comprises a housing 110 defining an internal cavity in which the specimen is loaded for cryopreservation. The device 100 comprises a membrane 140, which is positioned outside of the internal cavity of the housing 110, but which is secured to the housing 110 in a position so as to be adjacent to, and define a bottom surface of, the internal cavity. The membrane 140 is secured to the housing 110 by a support ring 150, which is attached (e.g., by fastener(s), an interference fit, etc.) to the housing 110 on an opposite side of the membrane 140 to secure the membrane to the housing 110. The support ring 150 has a generally annular shape that is substantially similar to the shape of the membrane. The support ring 150 and the membrane 140 may have any suitable shape that would result in the internal cavity of the housing 110 being substantially sealed at the bottom surface thereof. The support is shown having two cross-members in the shape of an "X" to act as a vertical support for the membrane 140. Any number of cross-members is contemplated for the support ring 150 and, in some embodiments, the support ring 150 can have no cross-members at all. The device 100 further comprises a cover 120, which can be secured to the upper surface of the housing 110. When the membrane 140 is installed at the bottom surface of the internal cavity of the housing 110 and the cover 120 is secured at the top of the internal cavity of the housing 110, the device is assembled such that the housing 110, the cover 120, and the membrane 140 forms a substantially sealed chamber. In some embodiments, the housing and the membrane 140 can be configured such that the membrane 140 is located in a side wall of the housing 110 and/or the cover 120 to define a semi-permeable boundary in any portion of the device 100. In some embodiments, the device 100 may have a membrane 140 arranged in two or more of, or all of, the bottom surface of the housing 110, the side walls of the housing 110, and/or the cover 120. As such, portions of the cover 120 and/or the side walls or bottom of the housing 110 may be made of such a semi-permeable membrane material as is disclosed herein regarding membrane 140. In certain embodiments, the bottom of the device 100 is a structure that fixes a degenerated cellulose membrane 140 with a frame (e.g., support ring 150) that is bound to the device 100 or the housing 110 of the device 100.

In some embodiments, the cover 120 is configured to allow cryopreservation medium to flow within the housing 110 when a specimen, or specimens, are loaded into the device 100 and to release any pressure generated within the device 100 during the cryopreservation process by sealing the housing 110 that is filled with cryopreservation medium and contains specimen(s) to prevent bubble formation within the device 100. In some embodiments, the cover 120 has a convex shape on a bottom surface thereof, which faces into the internal cavity when placed on and/or secured to a housing 110 of the device 100. In some such embodiments, the cover 120 has at least one venting channel formed therein. The convex shape of such a cover 120 pushes the cryopreservation medium towards the perimeter of the housing without generating bubbles, where the venting channels allow for the release of the cryopreservation medium from within the housing 110 without building pressure therein.

In some embodiments, the support ring 150 protects the membrane 140 from being mechanically damaged or deformed when the cover 120 allows the cryopreservation medium to flow into the housing during the cryopreservation process. In some embodiments, the support ring 150 comprises a frame that is bound to the bottom of the device 100. In some such embodiments, the frame of the support ring 150 is in the shape of a cross formed by thin cross-members. In some embodiments, it is advantageous for the support ring 150 to be removable from the device 100 with minimal mechanical force, but the support ring 150 nevertheless having a connection to the housing 110 that is strong enough to prevent membrane damage or deformation by the support ring 150 becoming dislodged from the housing during the cryopreservation process. When access to the specimen(s) within the device 100 is needed, the device 100 is thawed, the support ring 150 is separated from the housing 110, and the membrane is broken, deformed, removed, etc. so that the specimen may be accessed directly. As such, in some embodiments the device 100 is not reusable for repeated cryopreservation of specimens.

FIGS. 9, 10, 12, and 13 show an example embodiment of a cryopreservation system, generally designated 101, which comprises an outer container, generally designated 300, to hold a cryopreservation device 100, as described hereinabove and illustrated in FIGS. 2-3A. In certain embodiments, the outer container 300 is a cryovial or cryotube that provides sufficient space to hold the device 100 and a sufficient amount of cryoprotectant solution in a space, generally designated 310, which is defined as being external to the device 100, but inside within the outer container 300.

Certain aspects of the present invention are illustrated by the following non-limiting examples.

Example 1. The Device is Designed to Block the Growth of Large Ice Crystals During Freezing of the Cryopreservation Medium A device 100 with a housing 110, which has a generally cylindrical internal cavity formed therein, has an outer diameter of 2.5 centimeters (cm) and a height of 1.4 cm. An example embodiment of such a device is shown in FIGS. 2-3B. The cover 120 is substantially disc-shaped, having a circular shape when viewed from the top, with a convex surface having a height of approximately 2 millimeters (mm) formed on the bottom surface thereof and four small venting channels formed about the perimeter of the cover 120. The housing 100 is a generally cylindrically-shaped structure that has a height of 1 cm, an outer diameter of 2.5 cm, and an inner diameter of 2 cm. The support ring 150 is inserted within a recess formed in an outer surface of the housing 110 and has an outer ring with an outer diameter of 2 cm and an inner diameter of 1.8 cm, with a thin X-shaped frame having a thickness of 1 mm the cross-members of the frame having a width of 1 mm attached to the inner radial surface of the ring. The support ring 150 is connected to the housing by being inserted tightly within a complementarily-shaped recess formed in a bottom exterior surface of the housing 110. The term complementarily-shaped means that the recess has an inner diameter that is substantially the same, if not slightly smaller, than the outer diameter of the support ring 150, such that in this example the recess of the housing 110 has an inner diameter of 2 cm. The housing has four feet having a height of 3 mm, such that the housing can be spaced apart from a contact surface of the feet to form a cavity underneath the housing 110, the cavity having a height defined by the height of the feet. The feet of the housing 110 enable the device to remain upright within an external cavity (e.g., a 15 milliliter (mL) cryovial) in a cryopreservation system, as shown in FIGS. 9, 10, 12, and 13. The components of the device 100 may be formed by any suitable manufacturing technique, including, for example, injection molding, additive manufacturing, and the like.

In this example, the device 100 is loaded with 2 mL Dulbecco's Modified Eagle Medium (DMEM) solution comprising 10% DMSO and 10% Ficoll as a polymer cryoprotectant to prevent recrystallization for −80° C. cryostorage, then the cover 120 is closed. The action of closing the cover 120 pushes any excess cryopreservation medium out of the housing 110. The device is 100 is placed in a 15 mL cryovial (e.g., 300, FIGS. 9, 10, 12, and 13) which is also loaded with 10 mL of the DMEM solution comprising 10% DMSO and 10% Ficoll. While not necessary during typical usage, in order to illustrate the advantages provided by the device 100, a first thermocouple is positioned in the center of the housing 110 through a hole provided solely for this illustrative example. A second thermocouple is positioned external to the housing 110, immediately adjacent to the membrane; the second thermocouple is fixed on one of the cross-members of the support ring 150. The cryovial is then exposed to a −80° C. ambient temperature environment (e.g., in a cryogenic freezer) and slowly cooled to −80° C. at a cooling rate of 0.5° C./min.

Figure 4:
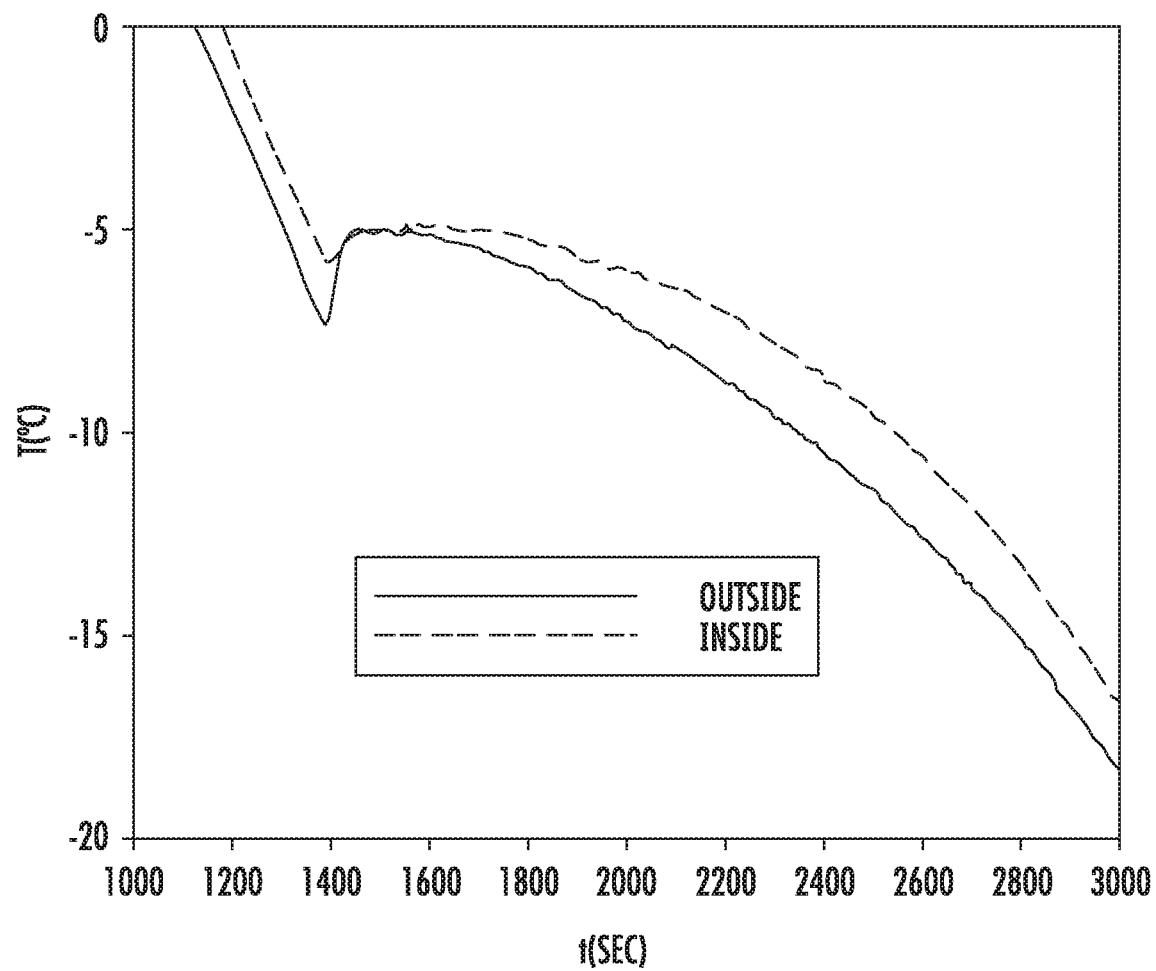
FIG. 4 is a graphical plot of temperature measurements inside and outside of a device and adjacent to the membrane of FIG. 2 over a period of time, demonstrating the reduction in size of ice crystals formed within the device during cryogenic freezing.

The temperature profiles read from the two thermocouples were recorded and are shown in FIG. 4. The temperature change external to the housing 110 shows the exothermal peak when the second thermocouple is contacted by the ice front during cooling to −80° C. The latent heat released from the ice front brings the super-cooled thermocouple back to the solution freezing point. In contrast, the temperature change measured by the first thermocouple located inside the housing 110, as a result of the fact that the membrane 140 blocks ice growth during the freezing process, demonstrates a very minimal temperature "bump" as an exothermal peak. Therefore, the membrane 140 acts as a barrier to prevent large ice crystals from directly contacting specimens contained within the housing 110, thereby resulting in significantly less supercooling and also preventing mechanical damage to any specimens contained within the housing 110. Mechanical damage to specimens during cryopreservation is typically generated by characteristic dendrite ice crystals formed during the supercooling process. These results agree well with the results shown in FIGS. 5A-5C that were obtained by direct observation of ice formation inside and outside of the housing 110 using neutron magnetic resonance (NMR) technology.

Figure 5A:
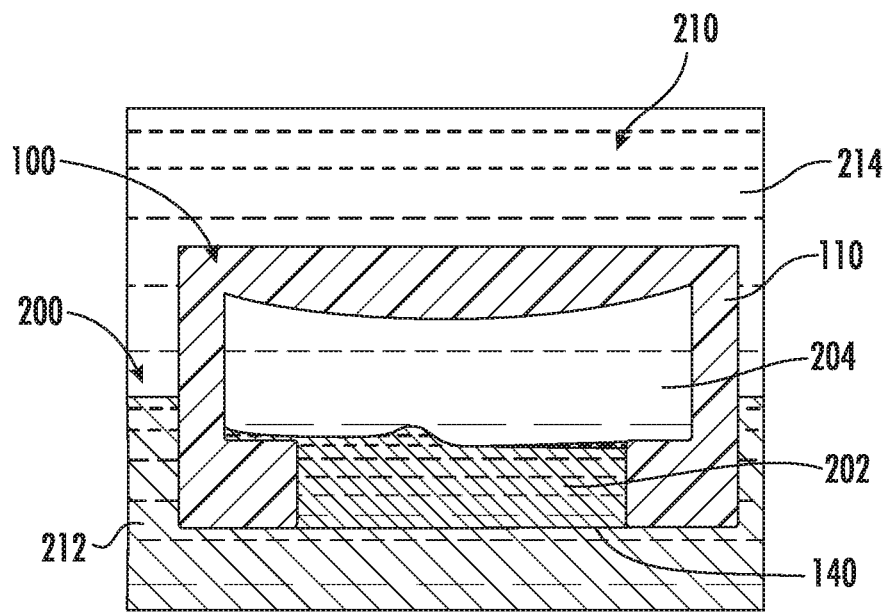
FIGS. 5A-5C show the progression of ice crystal formation within a device of FIG. 2 at several stages during the cryogenic freezing process.
Figure 5B:
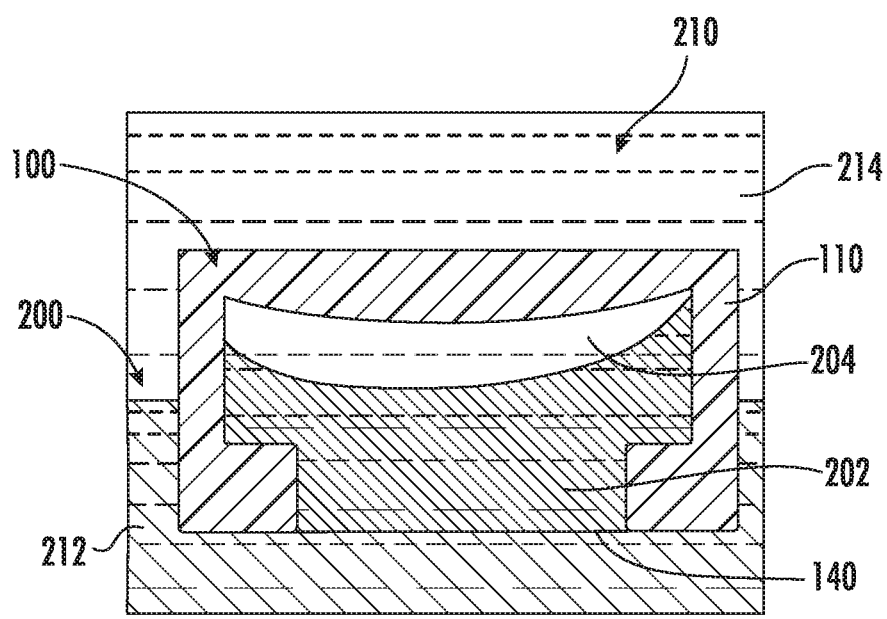
Figure 5C:
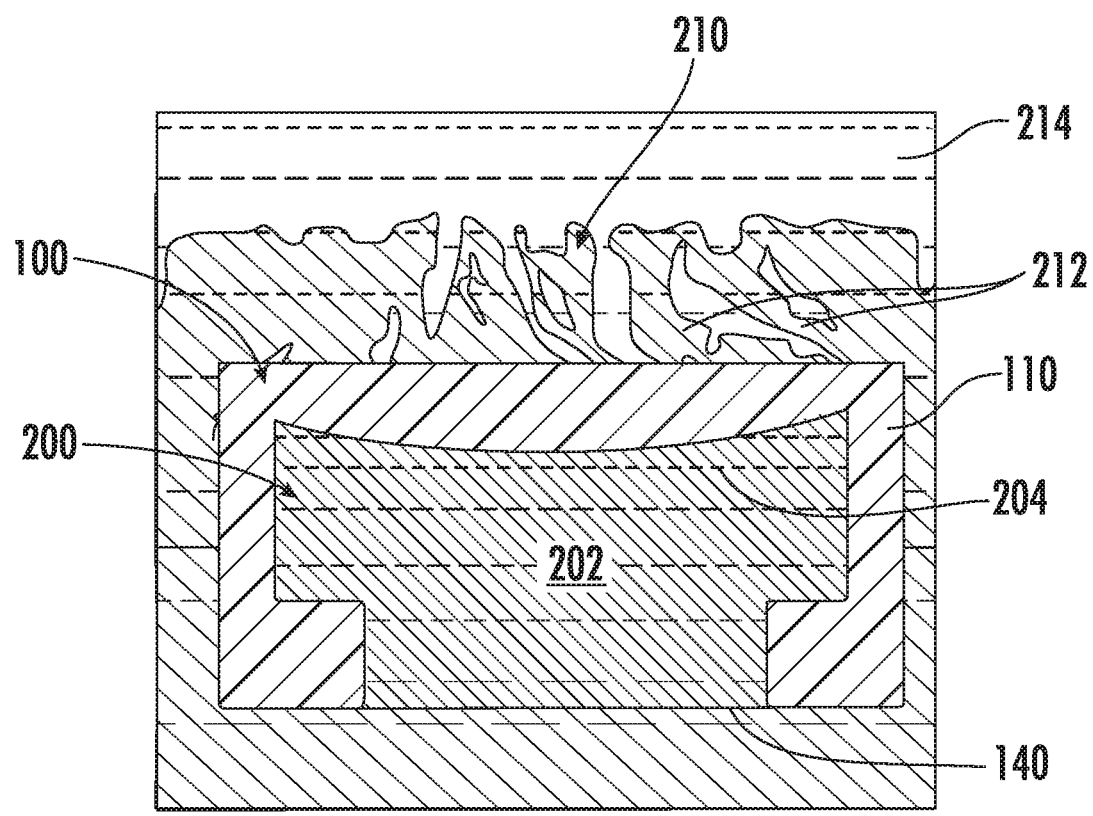

Example 2. NMR Imaging Directly Demonstrates the Difference in Ice Formation Processes for Ice Separated by the Membrane Structure of the Device of the Present Invention NMR imaging of the freezing process of the cryopreservation medium inside the device 100 is carried out on a 7 T/210 mm horizontal bore Varian Unity Inova MRI system (Varian Inc., Palo Alto, California, United States of America) equipped with a quadrature driven birdcage RF coil having an inner diameter of 10 cm. The device 100, which is loaded as described in Example 1 hereinabove, is mounted in a small outer container (e.g., a polypropylene bucket) having a height of 5 cm and a diameter of 5 cm, the container having smashed dry ice (approximately 10 mL) arranged on the bottom thereof. The bottom of the device 100 (e.g., the bottom surface of the housing 110) directly contacts the dry ice (−78° C. on the surface at $1.01 \times 10^5$ Pa), simulating the cooling process in a −80° C. ambient environment. As shown in FIGS. 5A-5C, as the ice front approaches the membrane 140, the progression of the ice front (e.g., the formation of ice crystals) is stopped by the membrane 140, while the ice front continues to grow along the sidewall of the housing 110. When the temperature of the cryopreservation medium at the membrane 140 is sufficiently low (e.g., at about −40° C.), small ice crystals are able to pass through the membrane 140 and form a curved, but rather uniformly shaped, ice front inside the housing 110, progressing from the inner surface of the membrane 140 into the housing 110. The growth rate of these small ice crystals within the housing 110 is much slower than the growth rate of the larger ice crystals located outside the housing 110. The results shown in the NMR images of FIGS. 5A-5C clearly demonstrate that the morphology of ice located outside the housing 110 has dendritic structures, and this morphology is in considerably sharp contrast to the morphology of the ice front located within the interior of the housing 110. Thus, it is shown that the membrane 140 acts as an ice sieve that stops large ice crystals from entering the housing 110 and only allows small ice crystals to pass through the membrane 140 at sufficiently low temperatures.

FIG. 5A shows the device 100 at an initial stage of cryopreservation, in which ice front has moved through the membrane 140 and into the internal cavity, generally designated 200, of the housing 110. The small ice crystals 202 within the internal cavity 200 are designated with the finer cross-hatching pattern from the large ice crystals 212 formed in the region 210 external to the housing 110. The majority of the cryopreservation medium within the internal cavity is a liquid 204 and the majority of the cryopreservation medium external in the region 210 is a liquid 214. FIG. 5B shows the device 100 at an intermediate stage of cryopreservation, in which the ice front has moved further into the internal cavity 200 and the region 210. As such, a majority of the cryopreservation medium within the internal cavity 200 now being in the form of small ice crystals 202, with the remainder of the cryopreservation medium therein being in the form of a liquid 204. Similarly, a majority of the cryopreservation medium within the region 210 is in the form of large ice crystals 212, with the remainder of the cryopreservation medium therein being in the form of a liquid 214. FIG. 5C shows the device 100 at an advanced stage of cryopreservation, in which the ice front has moved through the entirety of the internal cavity 200, such that the entirety of the internal cavity 200 is occupied by the small ice crystals 202. Similarly, a majority of the cryopreservation medium within the region 210 is in the form of large ice crystals 212 than is shown in FIG. 5B, with the remainder of the cryopreservation medium within the region 210 being in a liquid state.

Example 3. NMR Imaging Shows how the Device Prevents Direct Contact of Corneal Endothelium with Growing Sharp Ice Dendrites The same MRI system and cooling procedure described in Example 2 were used in this Example 3. A higher resolution was used to detect ice dendrite details. The results are shown in FIGS. 6A-6H. Two specimens 10 (e.g., human cornea tissues) were mounted in two different devices 100, a first such device having the with the semi-permeable membrane 140 in place as shown in FIGS. 2-3A, and a second such device 100 having the membrane 140 omitted. The cryopreservation medium filling both of the devices 100 and the respective cryovial (e.g., 300, FIGS. 9, 10, 12, and 13) holding each device 100 is DMEM solution with 10% DMSO and 10% Ficoll.

As demonstrated in FIGS. 6A-6D, the device 100 with the membrane 140 efficiently slowed the formation of ice in the housing 110, and also removed sharp ice dendrites from the growing ice front that approaches the corneal endothelium layer (the surface of the tissue that faces the membrane 140).

In FIG. 6A, the ice front is at, and has partially passed through, the membrane 140, such that almost all (e.g., 90% or more) of the internal cavity 200 within housing 110 is occupied by the liquid cryopreservation medium 204, with a minority of the internal cavity 200 being occupied by small ice crystals 202. The cryopreservation medium external to the housing 110 within region 210 is partially frozen, having large ice crystals 212 formed in the area underneath the bottom of the housing 110, adjacent the membrane 140, and the remainder of the cryopreservation medium within the region 210 being in a liquid state. As shown by the larger hatching pattern in FIGS. 6A-6D, the size of the small ice crystals 202 in the internal cavity 200 is smaller (e.g., at least by an order of magnitude) than the size of the large ice crystals 212 in the region 210.

In FIG. 6B, the ice front has progressed within the internal cavity 200, such that the small ice crystals 202 are partially enveloping the specimen 10, with the majority of the cryopreservation medium within the internal cavity 200 remaining in the liquid state 204. The cryopreservation medium external to the housing 110 within region 210 is frozen to a further extent than shown in FIG. 6A, having large ice crystals 212 formed in the area underneath the bottom of the housing 110, adjacent the membrane 140, and progressing around the sides of the housing 110, the remainder of the cryopreservation medium within the region 210 being in a liquid state. The small ice crystals 202 formed within the internal cavity 200 remain smaller, as described elsewhere herein, than the large ice crystals 212 formed external to the housing 110.

In FIG. 6C, the ice front has progressed within the internal cavity 200, such that the small ice crystals 202 are almost fully enveloping the specimen 10, with the majority of the cryopreservation medium within the internal cavity 200 now being in the form of small ice crystals 202 and the minority of the cryopreservation medium within the internal cavity being in the liquid form 204. The cryopreservation medium external to the housing 110 within region 210 is frozen to a further extent than shown in FIG. 6B, having large ice crystals 212 formed in the area underneath the bottom of the housing 110, adjacent the membrane 140, and progressing further around the sides of the housing 110, the remainder of the cryopreservation medium within the region 210 being in a liquid state. The small ice crystals 202 formed within the internal cavity 200 remain smaller, as described elsewhere herein, than the large ice crystals 212 formed external to the housing 110.

In FIG. 6D, the ice front has progressed within the internal cavity 200, such that the small ice crystals 202 are fully enveloping the specimen 10, with the entire volume of the internal cavity 200 now being in the form of small ice crystals 202, such that none, or substantially none, of the cryopreservation medium within the internal cavity is in the liquid form 204. The cryopreservation medium external to the housing 110 within region 210 is frozen to a further extent than shown in FIG. 6C, having large ice crystals 212 formed in the area underneath the bottom of the housing 110, adjacent the membrane 140, and around substantially all of the sides of the housing 110, the remainder of the cryopreservation medium within the region 210 being in a liquid state. As the cryopreservation freezing process proceeds, all of the cryopreservation medium within the region 210 will be frozen to form large ice crystals 212, such that all of the cryopreservation medium within the housing 110 will be in the form of small ice crystals 202 and all of the cryopreservation medium outside the housing 110 will be in the form of large ice crystals 202 The small ice crystals 202 formed within the internal cavity 200 remain smaller, as described elsewhere herein, than the large ice crystals 212 formed external to the housing 110.

As demonstrated in FIGS. 6E-6H, in which no such membrane 140 was present in the device 100, the device 100 did not offer any protective function to the corneal endothelium and resulted in direct contact of the corneal endothelium with the sharp ice dendrites.

In FIG. 6E, the ice front is at, and has partially passed into the internal cavity 200 of the housing 110, at or beyond the slot in which a membrane could be installed, such that almost all (e.g., 90% or more) of the internal cavity 200 within housing 110 is occupied by the liquid cryopreservation medium 204, with a minority of the internal cavity 200 being occupied by large ice crystals 212. The cryopreservation medium external to the housing 110 within region 210 is partially frozen, having large ice crystals 212 formed in the area underneath the bottom of the housing 110, adjacent the membrane 140, and the remainder of the cryopreservation medium within the region 210 being in a liquid state. As shown by the hatching pattern being consistent in FIGS. 6E-6H for the large ice crystals 212, the size of the large ice crystals 212 in the internal cavity 200 is the same size as the large ice crystals 212 in the region 210.

In FIG. 6F, the ice front has progressed within the internal cavity 200, such that the large ice crystals 212 are partially enveloping the specimen 10, with the majority of the cryopreservation medium within the internal cavity 200 remaining in the liquid state 204. The cryopreservation medium external to the housing 110 within region 210 is frozen to a further extent than shown in FIG. 6E, having large ice crystals 212 formed in the area underneath the bottom of the housing 110, adjacent the membrane 140, and progressing around the sides of the housing 110, the remainder of the cryopreservation medium within the region 210 being in a liquid state. The large ice crystals 212 formed within the internal cavity 200 remain substantially the same size, as described elsewhere herein, as the large ice crystals 212 formed external to the housing 110.

In FIG. 6G, the ice front has progressed within the internal cavity 200, such that the large ice crystals 212 are almost fully enveloping the specimen 10, with the majority of the cryopreservation medium within the internal cavity 200 now being in the form of large ice crystals 212 and the minority of the cryopreservation medium within the internal cavity being in the liquid form 204. The cryopreservation medium external to the housing 110 within region 210 is frozen to a further extent than shown in FIG. 6F, having large ice crystals 212 formed in the area underneath the bottom of the housing 110, adjacent the membrane 140, and progressing further around the sides of the housing 110, the remainder of the cryopreservation medium within the region 210 being in a liquid state. The large ice crystals 212 formed within the internal cavity 200 remain substantially the same size, as described elsewhere herein, as the large ice crystals 212 formed external to the housing 110.

In FIG. 6H, the ice front has progressed within the internal cavity 200, such that large ice crystals 212 are fully enveloping the specimen 10, with the entire volume of the internal cavity 200 now being in the form of large ice crystals 212, such that none, or substantially none, of the cryopreservation medium within the internal cavity is in the liquid form 204. The cryopreservation medium external to the housing 110 within region 210 is frozen to a further extent than shown in FIG. 6G, having large ice crystals 212 formed in the area underneath the bottom of the housing 110, adjacent the membrane 140, and around substantially all of the sides of the housing 110, the remainder of the cryopreservation medium within the region 210 being in a liquid state. As the cryopreservation freezing process proceeds, all of the cryopreservation medium within the region 210 will be frozen to form the large ice crystals 212, such that all of the cryopreservation medium, both within and external to the housing 110, will be in the form of large ice crystals 212. The large ice crystals 212 formed within the internal cavity 200 remain substantially the same size, as described elsewhere herein, as the large ice crystals 212 formed external to the housing 110.

Figure 7:
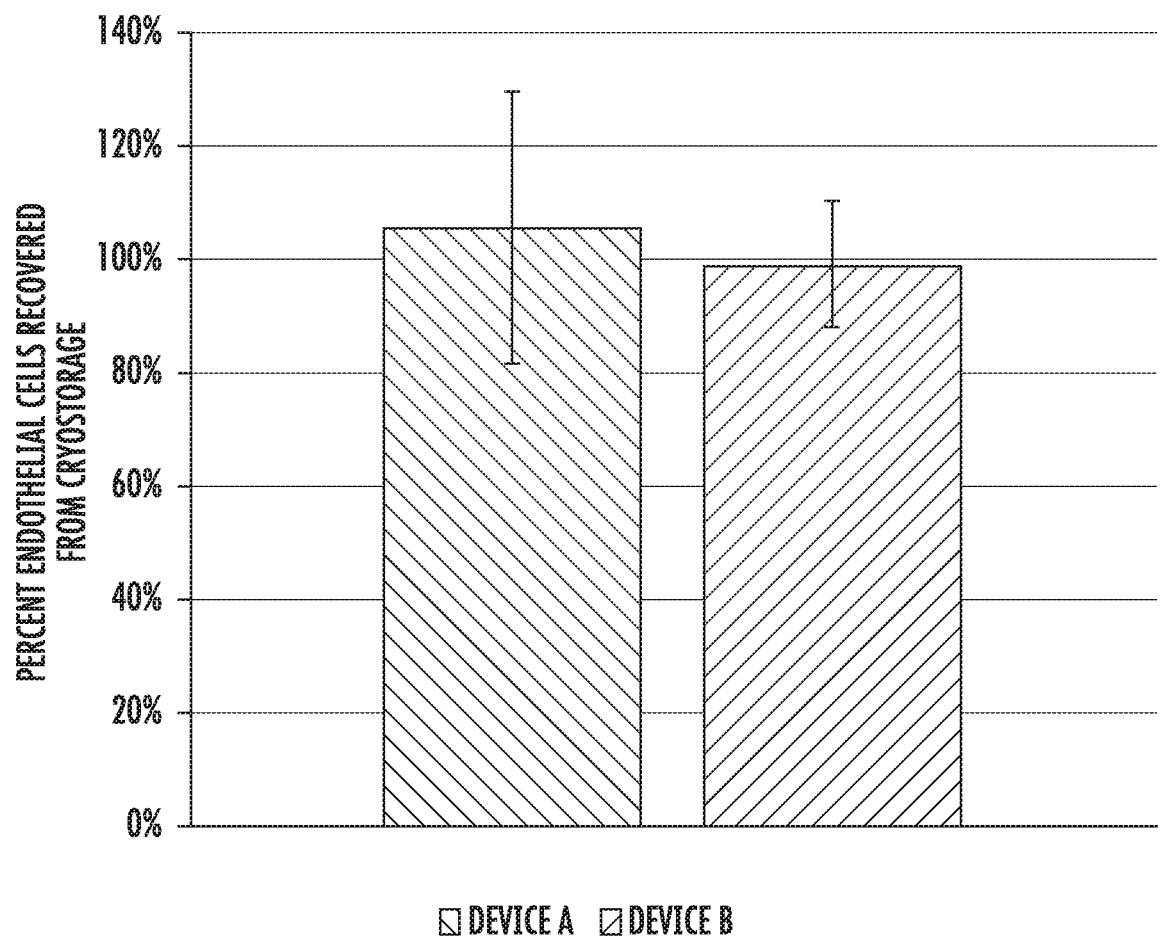
FIG. 7 is a graphical representation comparing the viability of the endothelium of human corneas that are thawed after having been cryogenically froze in a device as shown in FIG. 2, but utilizing membranes having different molecular weight cut-off values.
Figure 8:
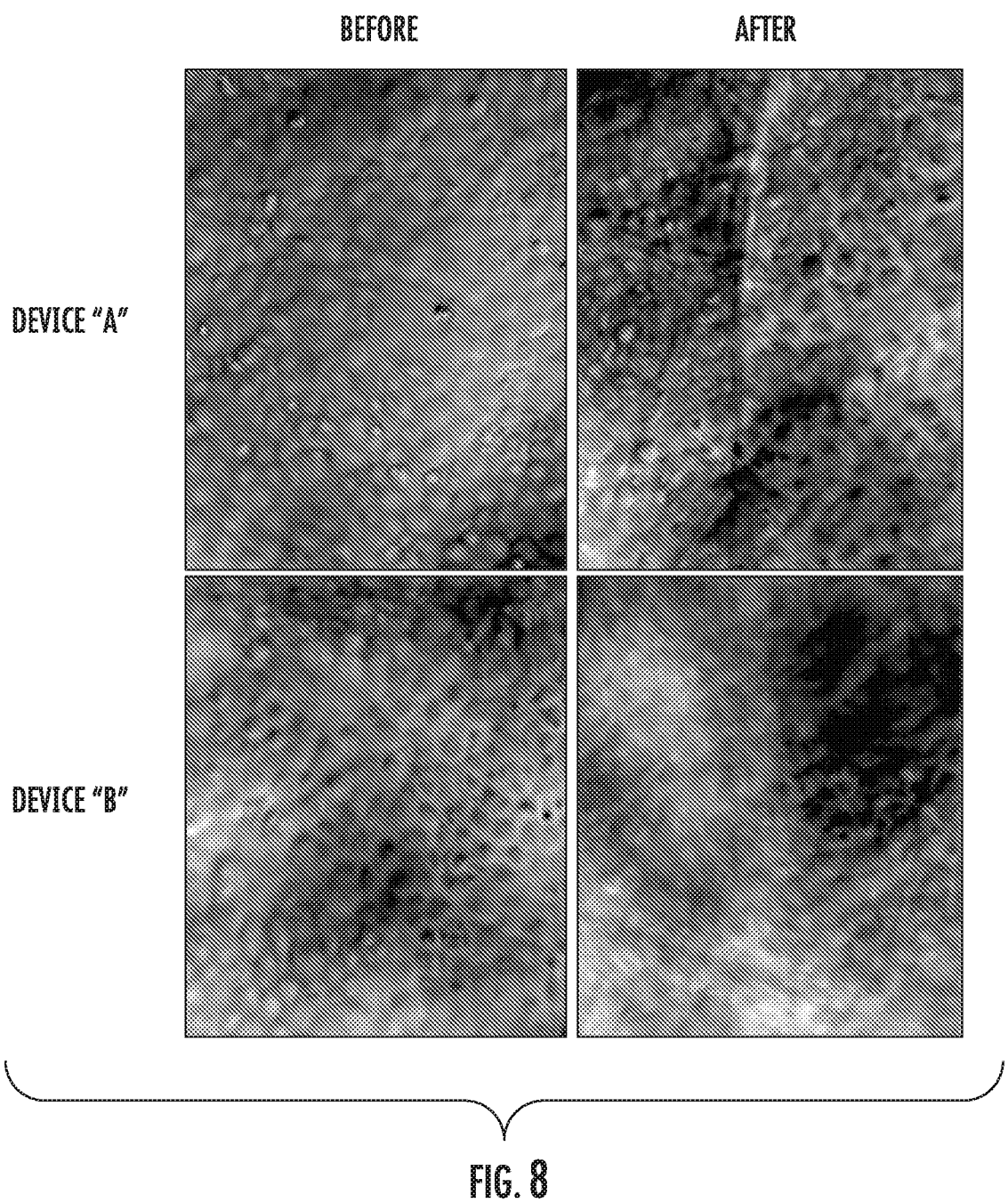
FIG. 8 shows images of the endothelium of human corneas both before and after being cryogenically frozen in a device as shown in FIG. 2, having the membranes of different molecular weight cut-off values in FIG. 7.

Example 4. Corneal Cryopreservation Improvement was Achieved by Using the Device for −80° C. Cryopreservation To demonstrate the efficiency of using the device 100 for cryopreservation of specimens comprising biological material through the working mechanism disclosed herein, thereby preventing direct contact of the specimens with large ice crystals during the freezing process, six human corneas were preserved in devices 100 substantially similar to the embodiment shown in FIGS. 2-3B. For the purposes of this demonstration, the devices 100 were constructed using an additive manufacturing technique, but any type of manufacture is contemplated without deviating from the scope of the subject matter disclosed herein. Two different types of membranes 140 were installed within the respective devices. A first type of membrane installed in a first subset of devices 100 was regenerated cellulose membranes with molecular weight cut-offs (MWCO) of 7,500 grams/mol (g/mol). A second type of membrane installed in a second subset of devices 100 was regenerated cellulose membranes with MWCO of 10,000 g/mol. Such regenerated cellulose membranes may be obtained from a manufacturer, such as Millipore. The cryopreservation medium added internal to and around the housing 110 comprised 5% DMSO, 10% Ficoll, 1% Dextran 40 and 2% chondroitin sulfate. Each cornea is mounted in a housing 110 of one of the devices, which was filled with the cryopreservation medium described immediately hereinabove, and was then stored in a −80° C. ambient environment (e.g., in a cryogenic freezer). After three months of storage, each of the devices 100 were thawed by directly plunging each of the devices 100 into a 37° C. water bath. The post-thaw endothelium cell counting and morphology are shown in FIGS. 7 and 8. Compared to traditional cryopreservation method for corneas that result in typically 50% or more endothelium cell loss during cryopreservation, the efficiency achieved with either of the first or second types of membranes 140 is significantly increased (e.g., to approximately 90% or higher) by the device 100 as presently disclosed for, for example, cryopreservation of human corneal tissue.

Figure 9:
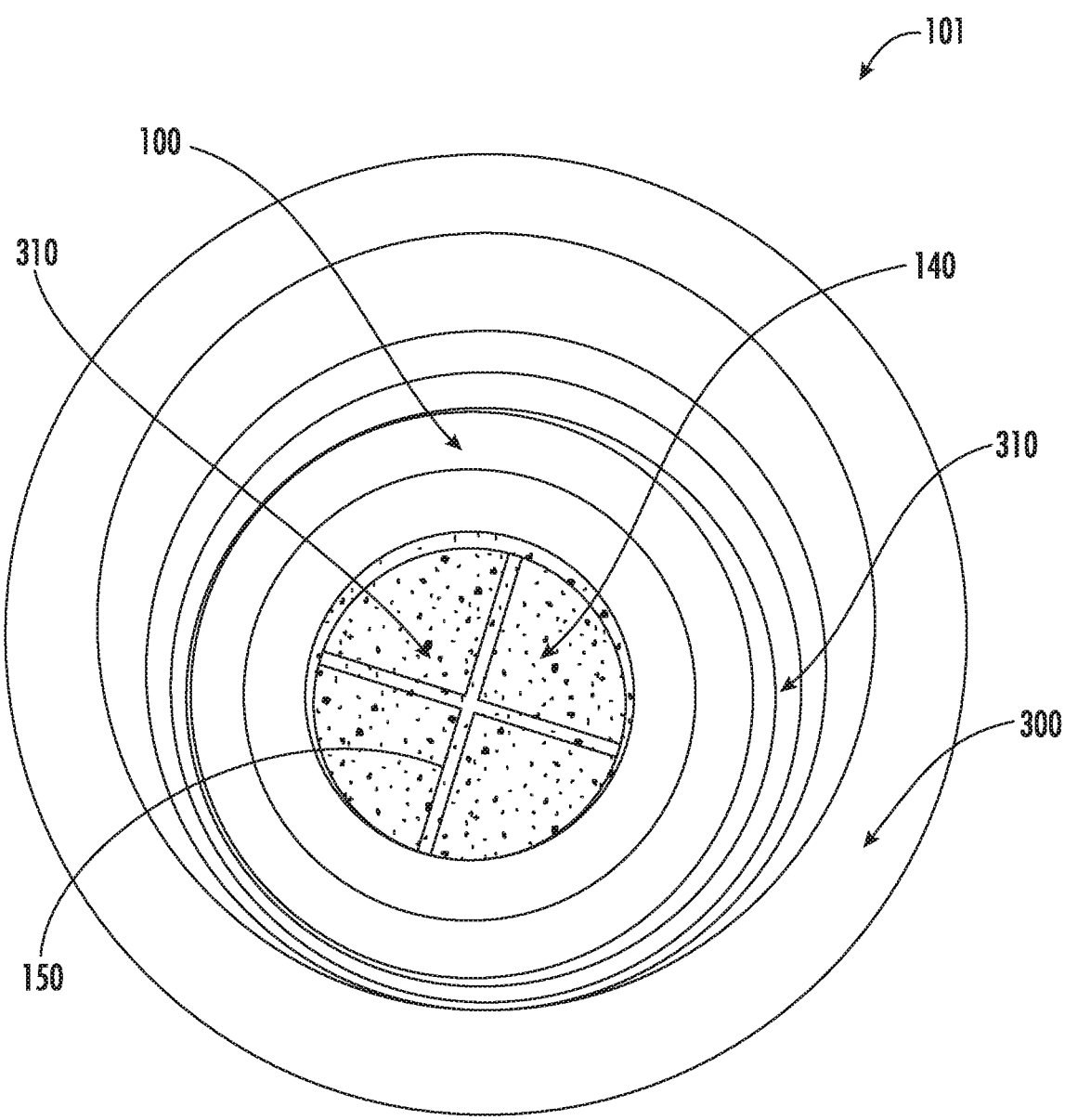
FIG. 9 is a top perspective view of a cryogenic storage system, comprising a device of FIG. 2 positioned within an outer vessel.
Figure 10:
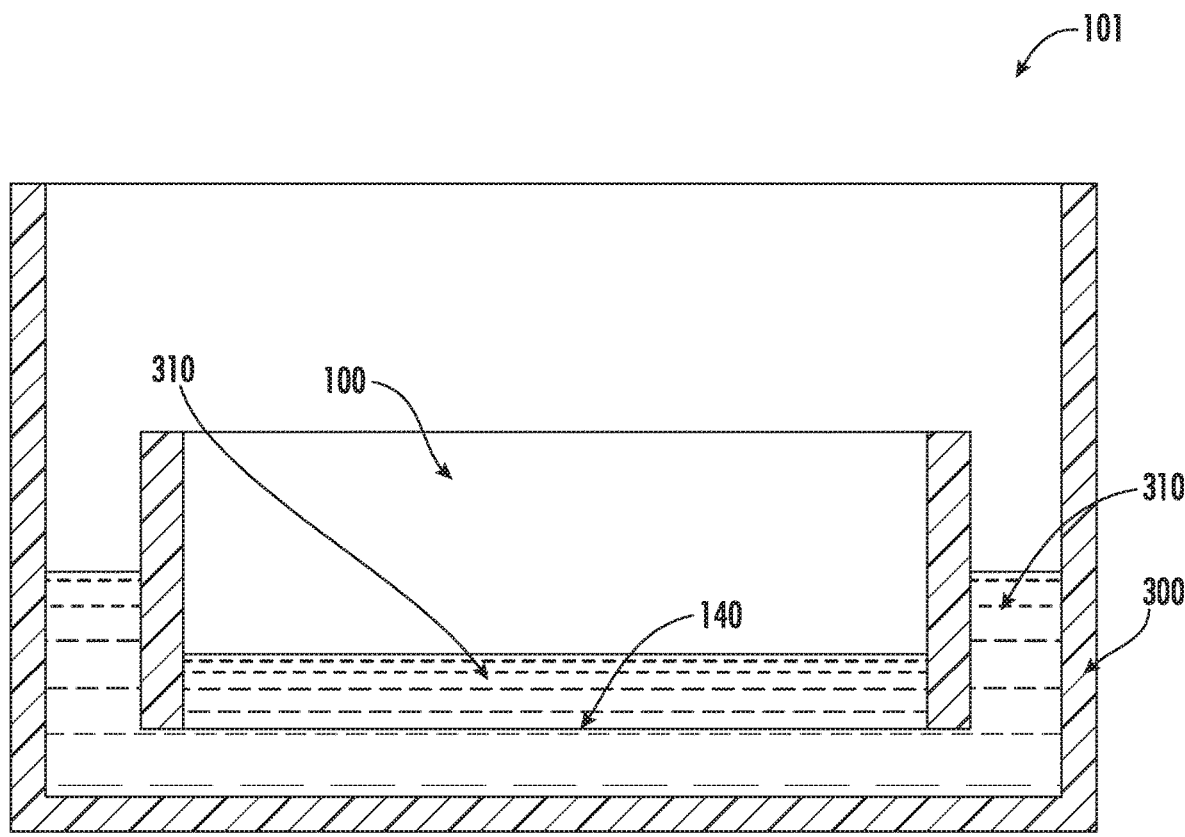
FIG. 10 is a cross-sectional view of the system of FIG. 9.

Example 5: The Device Attenuates Mammalian Cell Damage During Cryogenic Freezing Procedures Using a Medium Free of Cryoprotectant Additives Modification of extracellular ice morphology using the device 100 can be applied to attenuate cell damage during freezing using a medium free of any cell permeating cryoprotectant additives. To demonstrate the efficiency of the device 100 even without the use of a specific cryopreservation medium, as disclosed elsewhere herein, mouse mesenchymal stem cells (mMSC) were used as the specimen and were frozen at −20° C. in their original culture media in the device 100. Specifically, an approximately 200 microliter (µL) mMSC suspension, generally designated 310, from a cell culture sample, with a cell density on the order of $10^{5-6}$ cells/mL, as determined by an automatic cell counter, was spread onto the bottom of the device 100, which comprised a membrane 140 in the form of a thin 7500 MWCO degenerated cellulose membrane, as disclosed elsewhere herein. The cell suspension 310 then formed a thin layer of liquid (e.g., approximately 2 cm in diameter, and less than 1 mm in thickness) on the top of the membrane 140. Another 3 mL cell suspension 310 from the same mMSC culture sample was added to a 15 mL cryovial, having an inner diameter of 2.5 cm, and formed a liquid section approximately 0.8 cm in height on the bottom of the cryovial (e.g., 300, FIGS. 9, 10, 12, and 13), external to the housing 110. The device 100 holding the layer of cell suspension 310 was then mounted into the cryovial, as illustrated in FIGS. 9 and 10, with the lower portion of the housing 110 being submerged, at least partially, into the cell suspension 310 contained within the cryovial, but outside of the housing 110.

Consequently, the culture media and the cells inside and outside of the device were separated by the membrane 140. The cryovial was then placed in a −20° C. laboratory freezer. After 90 minutes, all liquid components (e.g., the cell suspension 310 inside and outside of the device 100) were completely frozen (e.g., had transitioned entirely from being in a liquid phase to being in a solid phase). The device 100 was then placed into a 37° C. water bath for thawing, and the post-thaw viability of the mMSC from the thawed cell suspensions 310 inside and outside the device 100 was analyzed by the standard Trypan blue exclusion assay in a standard automatic cell counter.

Figure 11A:
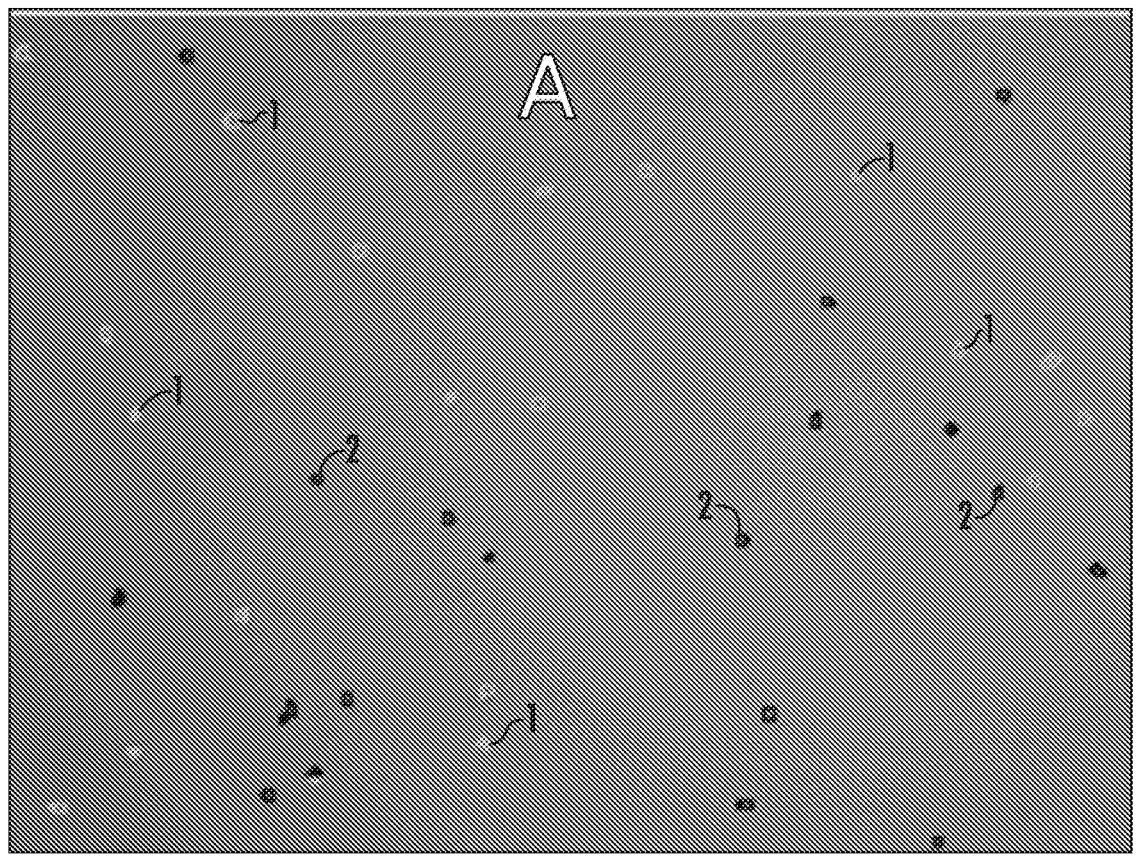
FIGS. 11A and 11B are schematic illustrations from an automatic cell counter showing the viabilities of the liquid inside (FIG. 11A) and outside (FIG. 11B) of the device of FIG. 9, post-thaw after having been cryogenically frozen.
Figure 11B:
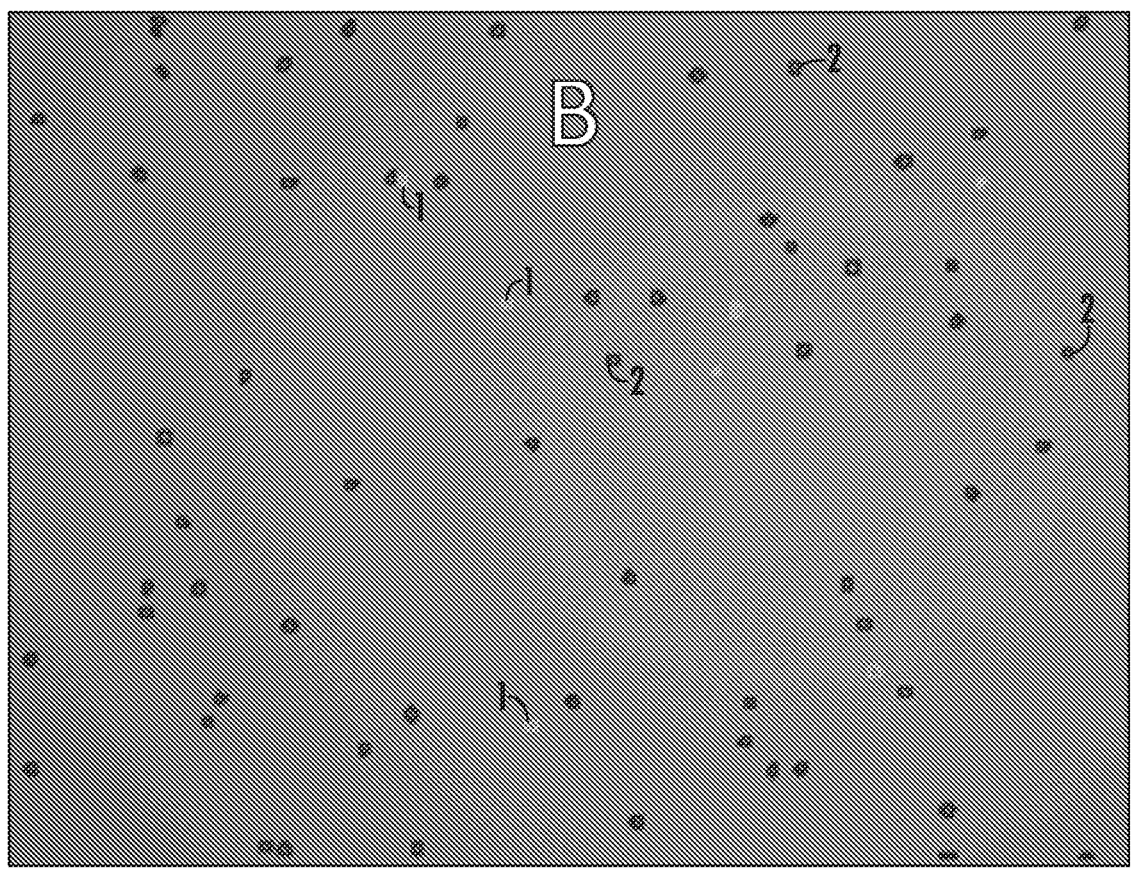

The experiment was replicated five times using cell suspensions 310 from five different cell culture samples. The post-thaw viabilities of the suspension layers inside the device 100 were determined by the automatic cell counter as 45.8±6.0%, while that for the cell suspensions outside of the device 100 (e.g., within the cryovial) were only 16.8±8.1%. FIGS. 11A and 11B show the typical results from the automatic cell counter for the cell suspensions 310 protected by the device 100 (FIG. 11A) and for the cell suspensions 310 that were unprotected by (e.g., external from) the device 100 during the freezing process. In FIG. 11A, the total cellular concentration was measured at $2.46 \times 10^5$ cells/mL, of which the live cells had a concentration of $1.29 \times 10^5$ cells/mL (52%) and the dead cells had a concentration of $1.17 \times 10^5$ cells/mL (48%). By comparison, as shown in FIG. 11B, the total cellular concentration was measured at $3.99 \times 10^5$ cells/mL, of which the live cells had a concentration of $4.69 \times 10^4$ cells/mL (12%) and the dead cells had a concentration of $3.52 \times 10^5$ cells/mL (88%).

As is clearly shown, the post-thaw viabilities of the cells protected by the membrane (e.g., within the device 100) are almost 200% higher than for the unprotected cells. One hypothesis regarding the reason for half of the cells inside the device being rendered nonviable during freezing is that the freezer temperature of −20° C. is quite close to the nucleation temperature of intracellular ice for mammalian cells when no permeating cryoprotectant (e.g. DMSO) is present. This effect could possibly introduce lethal intracellular ice formation as a random and progressive process for the entire cell population. Therefore, even when no cell permeating cryoprotectant is used, the device of the present invention is able to attenuate cell damage generated by extracellular ice formation; however, such function cannot completely protect cells from damaging effects resulting from random intracellular ice formation.

Figure 12:
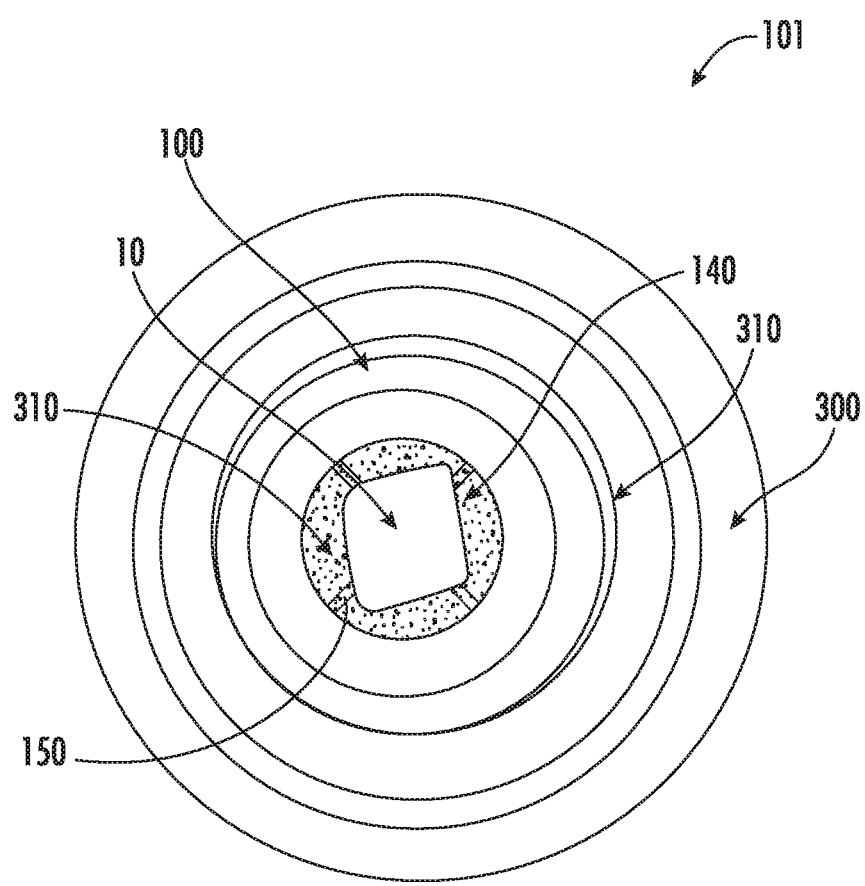
FIG. 12 is a top perspective view of the system of FIG. 9 with an organic specimen positioned within the device.
Figure 13:
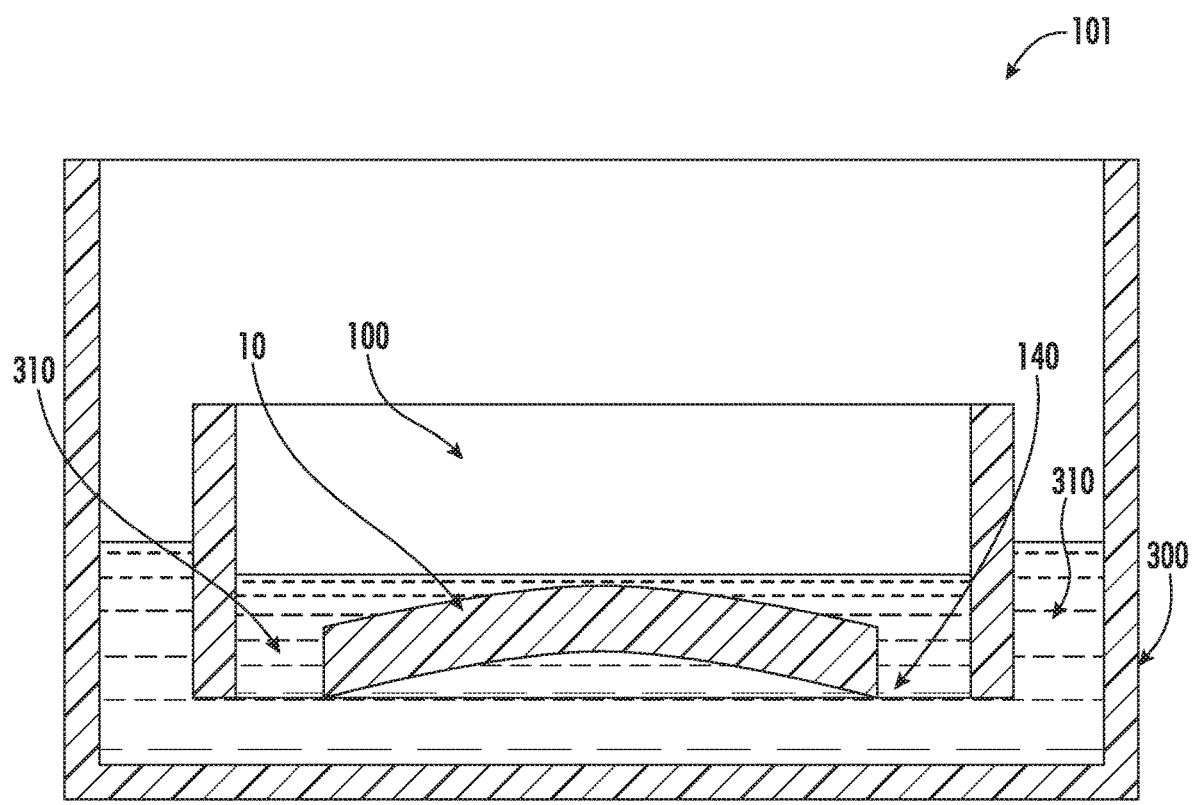
FIG. 13 is a cross-sectional view of the system of FIG. 12.

Example 6: The Device Attenuates Plant Tissue Damage During Freezing Procedures without Using any Cryoprotectant Additives Modification of extracellular ice morphology using the device 100 can be applied to attenuate damage to specimens comprising plant tissues during freezing without using any cryoprotectant. To demonstrate the efficiency of the application, onion pulp tissues whose topmost layer an epidermal cell layer, were used as the specimen 10. The specimens were cut into 1 cm×1 cm size, with average thickness approximately 3-4 mm. A PBS (standard saline) solution 310 sample 1 mL in volume was added into the housing 110 of the device 100, and one specimen 10 was then submerged into the PBS solution, with the epidermal cell layer facing the degenerated cellulose membrane 140 (here, having a 7500 MWCO). The device 100 was then placed into a 15 mL cryovial (e.g., 300) containing 3 mL PBS solution 310, as shown in FIGS. 12 and 13, such that the housing was submerged, at least partially, within the PBS solution 310. Thus, the PBS solutions 310 located inside and outside of the device 100 were separated by the membrane 140. The entire sample was then exposed to a −80° C. ambient environment (e.g., in a cryogenic freezer). After 60 minutes, the specimen 10, as well as the PBS solutions within the device 100 and within the cryovial, was substantially or entirely frozen, and was submerged in a 37° C. water bath for thawing. The thawed specimens 10 were stained by Trypan blue on their epidermal cell layer, and a standard stereomicroscope was used to analyze cell viability and tissue structure.

Figure 14:
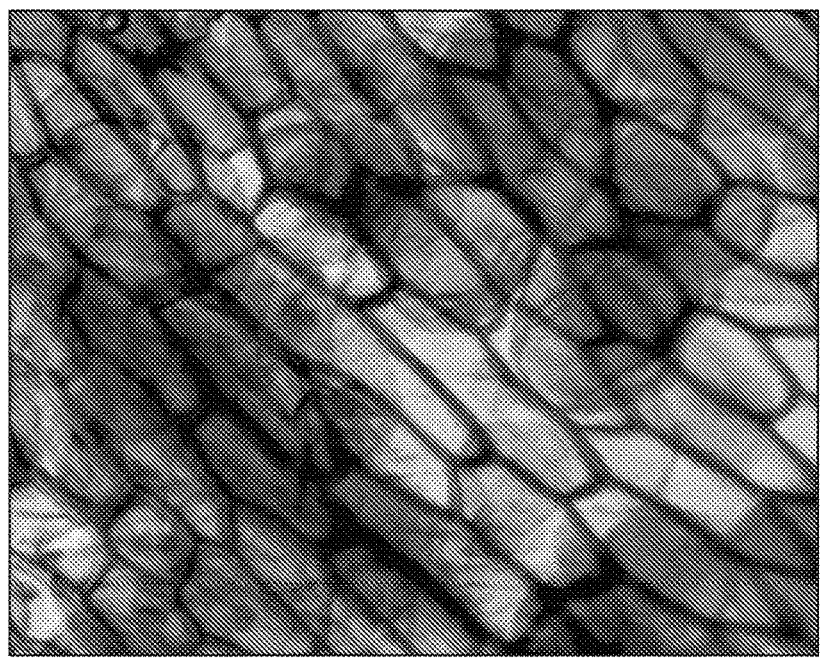
FIG. 14 is an example stereomicroscopic view of the organic specimen shown in FIG. 12, which has been cryogenically frozen and subsequently thawed.
Figure 15:
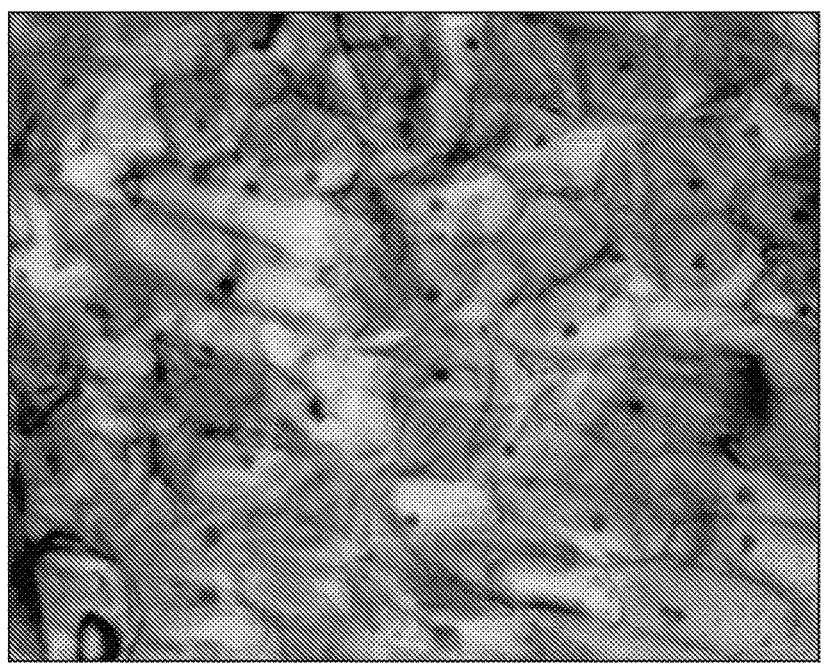
FIG. 15 is an example stereomicroscopic view of a substantially similar organic specimen to that shown in FIG. 12, but which is cryogenically frozen according to a traditional cryogenic technique.

For comparison, the fresh tissues of the same size were directly loaded into 3 mL PBS solutions 310 in 15 mL cryovials, without using the device 100, and were then frozen, thawed and analyzed by following the same procedures described above. The typical morphology of post-thaw and stained specimens 10 under the observation of the stereomicroscope is shown in FIGS. 14 and 15, for tissues either protected by such a device 100 (FIG. 14), or unprotected by such a device 100, (FIG. 11B) during the freezing process. As shown in FIG. 14, the tissue structures of the specimen 10 were well preserved for the tissue protected by the device 100, with all of the cell morphology similar to fresh tissues, with approximately half of the cells of the specimen being nonviable based on the appearance of their stained cell nucleus. In contract, as shown in FIG. 15, the tissue structures of the specimen 10 that was not protected by such a device 100 were deformed and all cells were severely damaged structurally.

Therefore, the device 100 disclosed herein can be used to preserve plant tissue structures and improve their cell viabilities without the need to use any cryopreservation media having a cell permeating cryoprotectant additives dissolved therein. When the onion tissues were frozen at −20° C. with or without the protection of the device 100, no cells lost their viability and tissue structures were not damaged due to the protective effects of the cell walls, which are structurally similar to degenerated cellulose membranes 140 used by the device 100. It can thus be concluded that the device of the present invention provides superior protection during freezing process to those temperature lower than −20° C. than the protection provided by cell walls of a similar plant tissue. Therefore, this result is an example that also demonstrates that the presently disclosed device 100 yields higher efficiency in cell protection when compared to a somewhat similar protective mechanism that is naturally formed by the cell walls of plant tissues, one of whose major components is cellulose.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A cryoprotective device for protecting a specimen from mechanical damage during cryopreservation, the device comprising:
  a housing comprising:
    a first opening formed at a first longitudinal end of the housing;
    a second opening;
    a semi-permeable membrane; and
    an internal cavity; and
  a cover that is configured to be secured to the housing to close the first opening;
  wherein the housing is configured to receive a first freezable medium within the internal cavity; and
  wherein the membrane is impermeable to ice crystals that are significantly larger than an average pore size of the membrane to prevent any such ice crystals from passing into the internal cavity from a region outside of the housing, such that ice crystals formed in the freezable medium within the housing have a smaller crystal size as compared to ice crystals formed in a second freezable medium that is outside of the housing.

2. The cryoprotective storage device of claim 1, wherein the membrane is arranged over the second opening.

3. The cryoprotective storage device of claim 2, wherein the housing is configured to receive the specimen within the internal cavity through the first opening.

4. The cryoprotective storage device of claim 1, wherein the housing is a buoyant support, to which the membrane is attached to define the internal cavity, such that the membrane is submersible within the second freezable medium, with at least a portion of the buoyant support not being submerged in the second freezable medium.

5. The cryoprotective storage device of claim 1, wherein the housing is formed substantially entirely from the membrane.

6. The cryoprotective storage device of claim 1, wherein the membrane is a porous solid layer.

7. The cryoprotective storage device of claim 6, wherein the porous solid layer allows water and liquid state material to permeate therethrough, but prevents the passage of ice crystals larger than a pore size of the membrane from passing through the membrane, the ice crystals being formed by solidification of the cryopreservation outside of the housing when the device is exposed to cryogenic temperatures.

8. The cryoprotective storage device of claim 6, wherein the porous solid layer comprises pores having pore diameters in a range from about 0.1 nanometer (nm) to about 1 millimeter (mm), from about 0.5 nm to about 0.1 mm, from about 1 nm to about 100 nm, or from about 2 nm to about 10 nm.

9. The cryoprotective storage device of claim 1, wherein the membrane comprises a natural or synthetic polymer.

10. The cryoprotective storage device of claim 1, wherein the membrane comprises a synthetic polymer comprising polyacrylonitrile, polymethylmethacrylate, polysulfone, ethylenevinyl alcohol co-polymer, or any combination or chemical derivative thereof.

11. The cryoprotective storage device of claim 1, wherein the membrane comprises a cellulose material.

12. The cryoprotective storage device of claim 11, wherein the cellulose material comprises regenerated cellulose, degenerated cellulose, cellulose diacetate, cellulose triacetate, or any combination or chemical derivative thereof.

13. The cryoprotective storage device of claim 1, wherein the membrane is a dialysis membrane made of degenerated cellulose.

14. The cryoprotective storage device of claim 1, wherein the membrane is permeable to water, organic and/or inorganic liquid solvents, or any combination thereof.

15. The cryoprotective storage device of claim 1, wherein the membrane is a separable membrane that is configured to be selectively mounted to cover the second opening.

16. The cryoprotective storage device of claim 1, wherein:
the first freezable medium comprises a cryoprotective medium having cryoprotective materials suspended therein as additives; and/or
the second freezable medium comprises a cryoprotective medium having cryoprotective materials suspended therein as additives.

17. The cryoprotective storage device of 1, wherein the housing comprises a recess in which the membrane is mounted to the housing to cover the second opening, the device comprising a support ring configured to be selectively attached to the housing to secure the membrane over the second opening when the support ring is attached to the housing.

18. The cryoprotective storage device of claim 17, wherein the support ring comprises an outer support member having a hole formed therethrough, such that the membrane is exposed to the second freezable medium, external from the housing through the hole formed in the support ring when the support ring is mounted to the housing.

19. The cryoprotective storage device of claim 17, wherein the housing comprises at least one locking tab that lockingly engages against the support ring to fasten the support ring to the housing.

20. The cryoprotective storage device of claim 1, wherein the first opening is configured such that the sample is passable into the internal cavity.

21. The cryoprotective storage device of claim 1, wherein the cover comprises at least one vent formed in a perimeter of the cover to allow the first freezable medium to flow through the at least one vent as the cover is secured to the housing.

22. The cryoprotective storage device of claim 1, wherein the cover comprises an interior surface that has a convex shape, such that the cover protrudes farther into the internal cavity at a center of the cover than at a perimeter of the cover.

23. The cryoprotective storage device of claim 1, wherein the housing has a generally cylindrical shape with a circular cross-section.

24. The cryoprotective storage device of claim 1, wherein:
the first freezable medium is a liquid at about 25° C. and a solid at about-20° C.; and/or
the second freezable medium is a liquid at about 25° C. and a solid at about −20° C.

25. A system for storing a specimen at a cryogenic temperature, the system comprising:
at least one cryoprotective storage device of claim 1;
an external container configured to receive one or more of the cryoprotective storage devices;
the first freezable medium within the internal cavity of the housing; and
the second freezable medium within the external container, outside of the housing.

26. The system of claim 25, wherein the first freezable medium and/or the second freezable medium comprises a hydrophilic and non-toxic macromolecule and an aqueous liquid.

27. The system of claim 26, wherein the first freezable medium and/or the second freezable medium comprises a cryoprotectant.

28. The system of claim 27, wherein the hydrophilic and non-toxic macromolecule is a polymer.

29. The system of claim 28, wherein the polymer forms a three-dimensional structure that is substantially spherical in shape when dissolved in an aqueous liquid.

30. The system of claim 28, wherein a concentration of the polymer in the first freezable medium and/or the second freezable medium is greater than about 5% (w/v), greater than about 10% (w/v), greater than about 20% (w/v), or greater than about 50% (w/v).

31. The system of claim 28, wherein;
a concentration of the cryoprotectant within the first freezable medium is equal to or greater than about 20%, equal to or greater than about 50%, equal to or greater than about 75%, or equal to or greater than about 100% of the concentration of the polymer in the first freezable medium; and/or
a concentration of the cryoprotectant within the second freezable medium is equal to or greater than about 20%, equal to or greater than about 50%, equal to or greater than about 75%, or equal to or greater than about 100% of the concentration of the polymer in the second freezable medium.

32. The system of claim 28, wherein the polymer is selected from the group consisting of hydrophilic polysaccharides, polymerized cyclodextrin or saccharides, globular proteins or spheroproteins, spherical glycoproteins formed by attaching oligosaccharide chains of globular proteins, other derivatives of globular proteins, and combinations thereof.

33. The system of claim 28, wherein the polymer is a hydrophilic polysaccharide.

34. The system of claim 26, wherein the aqueous liquid comprises a cell culture medium, a nutritious medium, a saline, or any combination thereof.

35. The system of claim 25, wherein the second freezable medium fills part or all of a space between the external container and the at least one cryoprotective storage device, the second freezable medium being provided in a quantity sufficient to at least cover a surface of the membrane oriented away from the internal cavity.

36. The system of claim 35, wherein a composition of the second freezable medium is different from, or the same as, a composition of the first freezable medium.

37. A method of protecting a specimen from damage during freezing, the method comprising:
providing a housing comprising:
a first opening formed at a first longitudinal end of the housing;
a second opening;
an internal cavity; and
a semi-permeable membrane;
providing the specimen and a first freezable medium in the internal cavity of the housing;
securing a cover to the housing to close the first opening;
placing the housing within a second freezable medium external from the housing, such that the housing is partially or entirely submerged in the second freezable medium, wherein the second freezable medium is the same as, or different from, the first freezable medium;
exposing the second freezable medium to a freezing temperature, such that ice crystals having a first size form external to the housing in the second freezable medium;
wherein growth of the ice crystals of the first size in the second freezable medium is stopped by the membrane, such that only ice crystals of a second size, which is smaller than a pore size of the membrane, can pass through the membrane and introduce ice formation in the first freezable medium within the internal cavity of the housing, thereby generating ice crystals in the first freezable medium, within the housing, that have a smaller size than ice crystals formed in the second freezable medium outside of the housing.

38. The method of claim 37, wherein the freezing comprises cryogenic freezing, and wherein the freezing temperature comprises a cryogenic temperature.

39. The method of claim 38, wherein:
the first freezable medium and/or the second freezable medium comprises a cryoprotectant; and
as a temperature of the first freezable medium decreases, water in the first freezable medium inside the housing permeates through the membrane, to increase a concentration of the cryoprotectant within the first freezable medium during the cryogenic freezing.

40. The method of claim 39, wherein permeating the water from the first freezable medium to the second freezable medium through the membrane increases a concentration of a solute in the first freezable medium and/or decreases a freezing temperature of the first freezable medium to prevent supercooling of the first freezable medium.

41. The method of claim 40, wherein:
the ice crystals formed in the second freezable medium are larger and are formed at a higher temperature than the ice crystals formed in the first freezable medium;
the membrane comprises a porous material having a pore diameter smaller than a diameter of the ice crystals formed in the second freezable medium; and/or
damage to the specimen is reduced, relative to storing the specimen in a housing without a membrane that allows water to permeate therethrough.

42. The method of claim 37, wherein the freezing comprises non-cryogenic freezing, and wherein the freezing temperature comprises a non-cryogenic temperature.

43. The method of claim 42, wherein the specimen and the first freezable medium comprise a cell suspension or biological tissue in a natural or conventional media and/or solution, wherein the first freezable medium is devoid of cryoprotectant.

44. The method of claim 37, wherein a first opening is formed at a first longitudinal end of the housing and the membrane is arranged over a second opening formed in the housing.

45. The method of claim 44, wherein the housing is configured to receive the specimen within the internal cavity through the first opening.

46. The method of claim 44, wherein the membrane is positioned over the second opening to allow fluid communication therethrough.

47. The method of claim 44, comprising attaching a support ring to the housing so that the membrane is secured to the housing over the second opening, the support ring having one or more opening formed therein to allow fluid communication through the membrane between the first freezable medium and the second freezable medium.

48. The method of claim 44, wherein the housing is a part of a cryoprotective storage device.

49. The method of claim 44, comprising providing an external container containing the second freezable medium before exposing the temperature of the second freezable medium to the cryogenic temperature, wherein exposing the temperature of the second freezable medium to the cryogenic temperature comprises placing the external container in an ambient environment having a cryogenic temperature, and wherein the housing is placed within the external container, such that the housing is partially or entirely submerged in the second freezable medium.

50. The method of claim 49, wherein the external container comprises a cryovial.

51. The method of claim 37, wherein the housing is a buoyant support to which the membrane is attached to define the internal cavity, such that the membrane is submersible within the second freezable medium, with at least a portion of the buoyant support not being submerged in the second freezable medium.

52. The method of claim 37, wherein the first freezable medium and/or the second freezable medium comprises a hydrophilic and non-toxic macromolecule and an aqueous liquid.

53. The method of claim 37, wherein the specimen and the first freezable medium are provided in the internal cavity through the first opening.

54. The method of claim 37, comprising securing a cover over the first opening.

55. The method of claim 54, wherein, when the cover is secured over the first opening, any excess first freezable fluid in the internal cavity is displaced from the internal cavity, such that the internal cavity is substantially free of air when the cover is secured over the first opening.

56. The method of claim 37, wherein the specimen comprises cells or at least one tissue sample suspended in the first freezable medium.

57. The method of claim 56, wherein the tissue sample comprises natural biological tissues, artificial tissues, or combinations thereof.

58. The method of claim 57, wherein the natural biological tissues comprise human, animal, plant, or microbial multiple cell tissues, or combinations thereof.

59. The method of claim 57, wherein the artificial tissues comprise artificial human, animal, plant, or microbial multiple cell tissues, or combinations thereof.

60. The method of claim 56, wherein the tissue sample comprises corneal tissue or retinal tissue.

61. The method of claim 56, wherein the cells comprise one or more eukaryotic cells, one or more prokaryotic cells, or combinations thereof.

62. The method of claim 61, wherein the one or more eukaryotic cells comprise at least one mammalian cell.

63. The method of claim 62, wherein the at least one mammalian cell comprises one or more murine cell, one or more porcine cell, one or more human cell, or combinations thereof.

64. The method of claim 62, wherein the at least one mammalian cell comprises one or more stem cell, one or more somatic cell, one or more reproduction cell, or combinations thereof.

65. The method of claim 61, wherein the one or more prokaryotic cells comprise at least one bacteria cell, at least one archeal cell, or combinations thereof.

66. The method of claim 37, wherein the freezing temperature is from about −273° C. to about 0° C., inclusive.

67. The method of claim 37, wherein the freezing temperature is from about −196° C. to about −20° C., inclusive.

68. The method of claim 37, wherein the freezing temperature is from about −100° C. to about −40° C., inclusive.

69. The method of claim 37, wherein the freezing temperature is from about −85° C. to about −65° C., inclusive.

70. A cryoprotective device for protecting a specimen from mechanical damage during cryopreservation, the device comprising:
a housing comprising:
a first opening formed at a first longitudinal end of the housing;
a second opening; and
a semi-permeable membrane;
wherein the housing comprises an internal cavity and is configured to receive a freezable medium within the internal cavity;
wherein the membrane is impermeable to ice crystals that are significantly larger than an average pore size of the membrane to prevent any such ice crystals from passing into the internal cavity from a region outside of the housing, such that ice crystals formed in the medium within the housing have a smaller crystal size as compared to ice crystals formed in a freezable medium outside of the housing; and
wherein:
the housing is a buoyant support to which the membrane is attached to define the internal cavity, such that the membrane is submersible within the freezable medium outside of the housing, with at least a portion of the buoyant support not being submerged in the freezable medium outside of the housing; or
the membrane is a separable membrane that is configured to be selectively mounted to cover the second opening; or
the housing comprises a recess in which the membrane is mounted to the housing to cover the second opening and the device comprises a support ring configured to be selectively attached to the housing to secure the membrane over the second opening when the support ring is attached to the housing.

* * * * *